United States Patent [19]

Shimizu et al.

[11] Patent Number: 4,717,936
[45] Date of Patent: Jan. 5, 1988

[54] DISPLAY DEVICE FOR CAMERA

[75] Inventors: Masami Shimizu, Tokyo; Nobuyuki Suzuki, Kawasaki, both of Japan

[73] Assignee: Canon Kabushiki Kaisha, Tokyo, Japan

[21] Appl. No.: 605,625

[22] Filed: Apr. 30, 1984

[30] Foreign Application Priority Data

| May 2, 1983 | [JP] | Japan | 58-76215 |
| May 2, 1983 | [JP] | Japan | 58-76216 |
| May 4, 1983 | [JP] | Japan | 58-77519 |
| May 4, 1983 | [JP] | Japan | 58-77520 |
| May 7, 1983 | [JP] | Japan | 58-78914 |
| May 9, 1983 | [JP] | Japan | 58-79441 |
| May 9, 1983 | [JP] | Japan | 58-79442 |
| May 10, 1983 | [JP] | Japan | 58-80062 |

[51] Int. Cl.⁴ .................................................. G03B 17/18
[52] U.S. Cl. .................................. 354/471; 354/474; 354/475
[58] Field of Search ................ 354/442, 474, 475, 471

[56] References Cited

U.S. PATENT DOCUMENTS

| 3,961,341 | 6/1976 | Numata et al. | 354/474 |
| 4,032,933 | 6/1977 | Ito et al. | 354/475 |
| 4,074,292 | 2/1978 | Nakamoto et al. | 354/474 |
| 4,112,439 | 9/1978 | Kawasaki et al. | 354/474 |
| 4,145,129 | 3/1979 | Kawamura et al. | 354/475 |
| 4,222,644 | 9/1980 | Tano et al. | 354/475 |
| 4,286,849 | 9/1981 | Uchidoi et al. | 354/475 |
| 4,309,090 | 1/1982 | Yamada | 354/474 |
| 4,365,236 | 12/1982 | Maida | 354/474 |
| 4,449,822 | 5/1984 | Yuasa et al. | 354/474 |
| 4,461,560 | 7/1984 | Yoshino et al. | 354/475 |
| 4,468,109 | 8/1984 | Maida | 354/442 |

FOREIGN PATENT DOCUMENTS 0046129 4/1975 Japan .
0057318 5/1981 Japan ................... 234/315

Primary Examiner—Russell E. Adams
Attorney, Agent, or Firm—Toren, McGeady, Stanger, Goldberg & Kiel

[57] ABSTRACT

A display device for a display in a camera. Within a view finder thereof in particular are arranged illuminating light emitting elements to illuminate a display member which is provided with a plurality of photography mode display marks. A segment light emitting element displays a computed value of photography information obtained from photography information computing apparatus.

12 Claims, 23 Drawing Figures

DISPLAY DEVICE FOR CAMERA

BACKGROUND OF THE INVENTION

1. Field of the Invention

This invention relates to a display device for displaying photography modes and photography information within a view finder of a photographic camera and more particularly to a display system which includes a display device disposed within a view finder and another display device disposed without the view finder. The display lights up or is put out depending on to the photography mode selected.

2. Description of the Prior Art

Conventional display devices of this kind include devices of the type having dot light emitting diodes (hereinafter called dot LED's for short) and a display film in combination outside of a view finder visual field to make a display by illuminating the display film with the dot LED's in a manner shown in FIGS. 1, 2 and 3 of the accompanying drawings. Referring to FIG. 1, a light from an object to be photographed, which comes through a photo-taking lens 1, is reflected by a turning mirror 2 to be imaged on a focus plate 3. The object image thus formed on the focus plate 3 is reflected by a penta-Dach prism 4 observable is a view finder field image as well known. Reference numeral 6 identifies a Fresnel lens for converging and reference numeral 7 identifies a light receiving photo sensitive element. They are arranged above an eyepiece 5 to confront the exit surface of the penta-Dach prism 4 as a light receiving system for light measurement. An information display member A is provided with a display film 8 and is below the penta-Dach prism 4 with the display film 8 opposed to a bottom face 4a of the penta-Dach prism 4. FIG. 2 is an enlarged exploded view of the above information display member A. The display film 8 is provided with, for example, information display marks such as photography mode display marks 8a and 8b and aperture value marks 8c, 8d, 8e, 8f, etc. Dot LED's 11a, 11b, 11c, 11d, 11e, 11f, etc. are secured onto a substrate 12 in positions corresponding respectively to the information display marks 8a, 8b, 8c, 8d, 8e, 8f, etc. Between the display film 8 and the substrate 12 are interposed, one after another, a diffusing tape 9 which has each of the information display marks 8a-8f evenly illuminated by the light from the corresponding LED's 11a-11f and a light shielding plate 10 which prevents the light of each of the LED's 11a-11f from leaking to any of the information display marks 8a-8f that differ from the corresponding one. FIG. 3 shows a view finder field. In the illustrated example, the information display mark 8e of the display film 8, which indicates an aperture value "16" of the photo-taking lens 1, is illuminated by a light emitted from the corresponding LED 11e via the combined arrangement of the light shielding plate 10 and the diffusing tape 9, in such a manner that the mark 8e alone appears on one side of the photo-taking visual field F as display information I.

The view finder display device of this type necessitates the provision of terminals and lead wires around the display part as power supply terminals and lead wires are indispensable to the display part. Therefore, the substrate 12 of the LED's 11a–11f includes a large unused area therein.

In view of this problem, the use of a seven-segment LED for a view finder display device in a camera has been proposed. FIG. 4 shows, by way of example, the essential parts of that type of view finder display device. The illustration of FIG. 4 includes a focus plate 21; a condenser lens 22; and a penta-Dach prism 23. An information source 24 is in a lower part behind the exit surface of the penta-Dach prism 23. A seven-segment LED 24b is attached to the surface of a substrate 24a. Numerals and letters indicative of shutter time values, aperture values and manual and automatic operation modes are formed, one after another, by means of the seven-segment LED 24b perpendicular to the paper surface of the drawing. Furthermore, the part of the substrate 24a other than the seven-segment LED 24b is an unused area 24c. The surface of the substrate 24a is covered with a plastic cover 24d. An information light introducing small prism 25 is disposed between the bottom surface (an incident surface) 23a of the penta-Dach prism 23 and the condenser lens 22 in front of the information source 24. The small prism 25 has an incident surface 25a, a reflection surface 25b and an exit surface 25c. A mask plate 26 is on the bottom surface 23a of the penta-Dach prism 23 to define a photo-taking visual field and an information display picture plane.

FIG. 5 shows a view finder visual field obtained by the display device of FIG. 4. Photography information 27 appears at a lower part on the lower outside of the photo-taking field F. The photography information 27 consists of shutter time information 27a, aperture value information 27b and automatic/manual selection information 27c. In this illustration, for example, the shutter time information 27a indicates "1000" (1/1000 sec), the aperture value information 27b "5.6" and the selection information 27c "M" (for manual).

The view finder display device of this type is extremely expensive as it necessitates the use of the seven-segment LED's 24b for many figures and the small prism 25 for light introduction. Compared with the penta prism 4, 23 generally used in conventional devices, use of a larger penta-prism 4, 23 is necessary since the lower visual field must be enlarged.

The present invention is directed to the solution of the above problems of conventional display devices. The invention aims to provide a view finder display device for a camera in which the display device of the type using an optical system as shown in FIG. 1 is modified; and a film display member illuminated by the dot LED's 11a–11f is on the same substrate 12 as that of a seven-segment LED 24b, so that a device capable of indicating many kinds of information 27 can be obtained at reduced size and cost.

Meanwhile, for driving the LED's 11a–11f, at constant current circuit which is shown in FIG. 6 or 7 has been employed. In the circuit shown in FIG. 6, a constant voltage of a constant voltage circuit 31 is impressed on the non-inversion input terminal of an operational amplifier 32, as well known, when voltage is supplied between a power source Vcc and a ground GND. Therefore, a negative feedback action brought about by the operational amplifier 32 and an NPN transistor 36 causes the potential of the inversion input terminal of the operational amplifier 32 to become equal to the constant voltage of the constant voltage circuit 31. As a result, a constant current flows to a resistor 35. When the current amplification rate (hfe) of the NPN transistor 36 is sufficiently high, the collector current and the emitter current of the NPN transistor 36 become equal. This also causes a constant current to flow to an LED 34. The LED 34 thus has a constant current flow thereto regardless of the voltage between the power source Vcc and the ground GND. Therefore, a display within the view finder remains stable. However, the operational amplifier 32 includes many transistors and thus has a great number of elements included therein, resulting in a complex structural arrangement. Furthermore, assuming that four LED's 34 are used for the display, for example, in order to equalize the brightness of these LED's 34 by individually adjusting currents for them according to their various characteristics, a total of four sets of the circuit of FIG. 6 is necessary with the exception of the constant voltage circuit 31 (the current value is adjusted by means of the resistor 35). The conventional circuit arrangement thus results in a great number of elements. Then, an attempt to reduce the number of elements has resulted in the circuit shown in FIG. 7. In this circuit arrangement, when a voltage is supplied between the power source Vcc and the ground GND, a constant voltage of a constant voltage circuit 41 is impressed on the base of an NPN transistor 42. The emitter of the NPN transistor 42 then produces a voltage which is obtained by subtracting a voltage between the base and emitter of the NPN transistor 42 from the constant voltage of the constant voltage circuit 41. A resistor 43, thus, approximately has constant voltages applied to the two terminals thereof. As a result, a nearly constant current flows to the resistor 43. This constant current also flows to a PNP transistor 44 which is diode connected. PNP transistors 45 and 46 have their bases connected in common with the PNP transistor 44. Therefore, if the resistance values of resistors 47 and 48 are zero, the collector currents of the PNP transistors 45 and 46 become equal to that of the PNP transistor 44. Therefore, it would be possible to adjust the uneven characteristics of LED's 49 and 50 by adjusting the value of the resistors 47 and 48 causing the LED's 49 and 50 to emit a light of even brightness. However, the voltages between the collectors and emitters of the PNP transistors 45 and 46 vary with the voltage between the power source Vcc and the ground GND. Then, the Early effect (base width modulating effect) of the transistors causes the collector currents of the PNP transistors 45 and 46 to change with the power supply voltage (or the voltage between the power source Vcc and the ground GND). The camera uses a battery the voltage of which decreases with the length of time in service. Therefore, variations in the brightness of display LED's present great inconvenience.

A first object of this invention is to provide a display device which can be compactly arranged with a small number of parts for displaying a selected photography operation mode and exposure information computed on the basis of information on a preset value.

A second object of this invention is to provide a display device wherein shutter time information and aperture value information are computed according to the photography operation mode selected; the selected mode and the computed information are displayed; and one information display can be shifted to another depending on the result of computation.

A third object of this invention is to provide a display device for display photography information for a camera capable of switching from one photography operation mode to another, wherein exposure information is displayed in a symbolized form when the number of numeral places of computed exposure information exceeds the number of places that can be displayed.

A fourth object of this invention is to provide a display device consisting of a view finder display device and an external display device which are arranged such that the illumination of the view finder display device is put out and exposure information is displayed by the external display device when an eyepiece shutter is closed.

These and further objects and features of the invention will become apparent from the following detailed description of preferred embodiments thereof taken in conjunction with the accompanying drawings.

SUMMARY OF THE INVENTION

To attain the first object, in accordance with the invention, the photography operation mode display is effected by a mode mark indicative of a mode selected in conjunction with an illumination light emitting element which illuminates the mode mark. As for the exposure display information display, segment light emitting elements make a numerical display. The arrangement is such that the photography operation mode and the exposure information can be accurately and clearly observable to prevent an erroneous photography operation due to erroneous observation.

BRIEF DESCRIPTION OF THE DRAWINGS

FIG. 1 is a sectional view showing the essential parts of a view finder optical system. FIG. 2 is an oblique view showing the structural arrangement of a display device. FIG. 3 is an illustration of a display made within a view finder field. FIGS. 4 and 5 are illustrations showing the structural arrangement of a display optical system within the view finder and a display made within the view finder field. FIGS. 6 and 7 are circuit diagrams respectively showing display devices.

FIG. 8 is an oblique view showing the structural arrangement of the display device. FIG. 9 is an illustration of a display made within a view finder field. FIG. 10 is a block diagram showing the circuits of the embodiment. FIGS. 11 and 12 are circuit diagrams showing the examples of the LED (light emission diode) driving circuit of the display device.

FIGS. 13-23 illustrate a fourth embodiment of the invention. Of these drawings, FIG. 13 is an oblique view showing the appearance of a camera body. FIG. 14 is an illustration of the display of an external display arrangement. FIG. 15 is a sectional view showing the essential parts of a view finder optical system. FIG. 16 is an exploded oblique view of the display device. FIG. 17 is an illustration of a display within a view finder field. FIGS. 18, 19 and 20 are illustrations of segment displays. FIG. 21 is a block diagram showing the circuits of the embodiment. FIG. 22 is a circuit diagram showing display circuit arrangement. FIG. 23 is a circuit diagram showing the an LED driving circuit included in the display circuit arrangement.

DETAILED DESCRIPTION OF THE PREFERRED EMBODIMENTS

Figure 8:
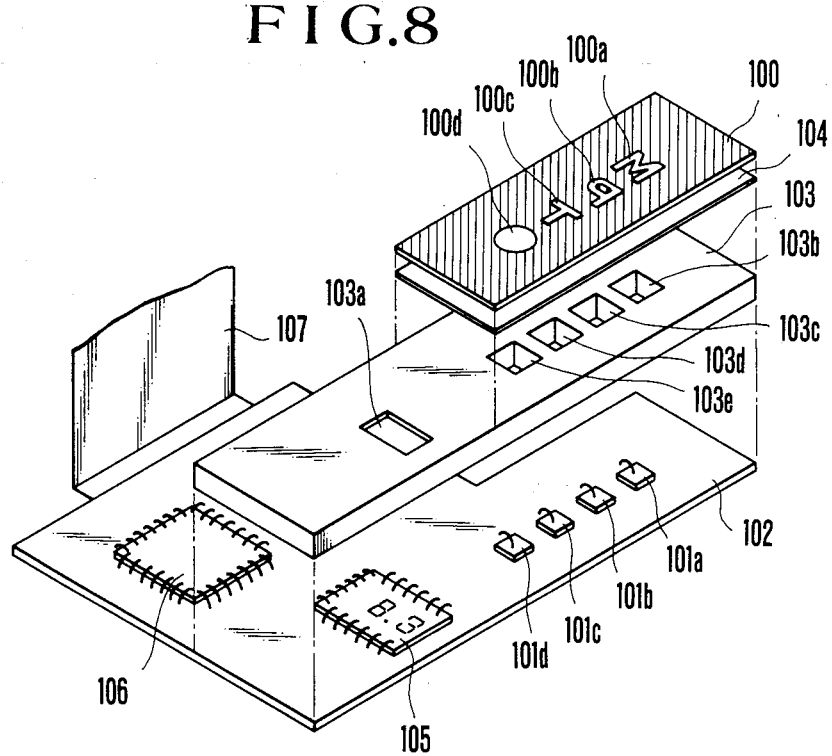
FIGS. 8-12 show a first embodiment of the invention. Of these drawings.

A first embodiment of this invention is shown in FIGS. 8 through 12. FIG. 8 is an exploded oblique view showing essential parts of the first embodiment. The view finder optical system of this example is identical with that of the conventional device shown in FIG. 1 and is therefore omitted from the illustration of FIG. 8.

Figure 1:
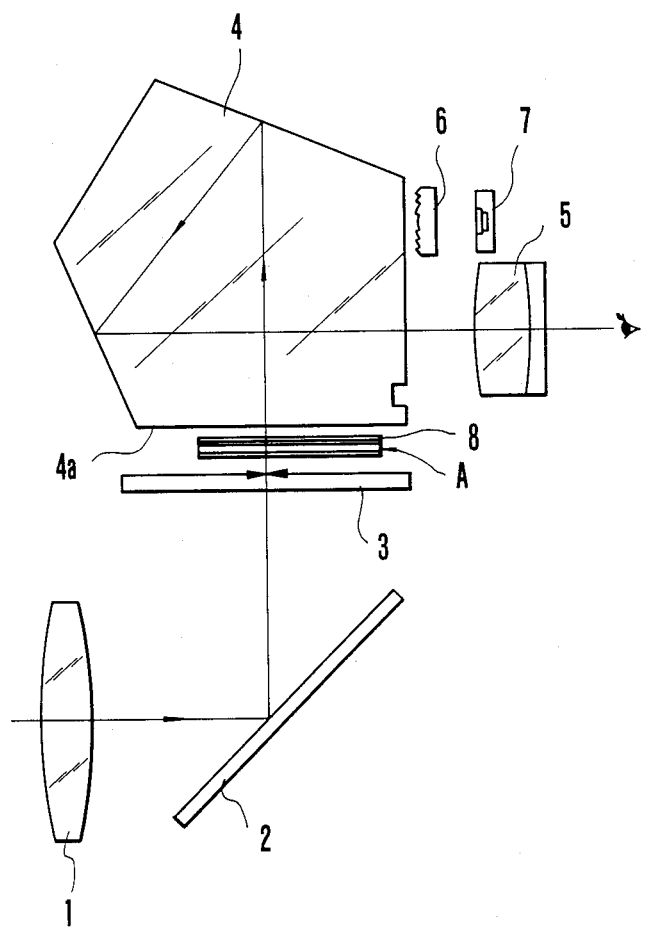
FIGS. 1 to 7 illustrate the prior art. Of these drawings.
Figure 2:
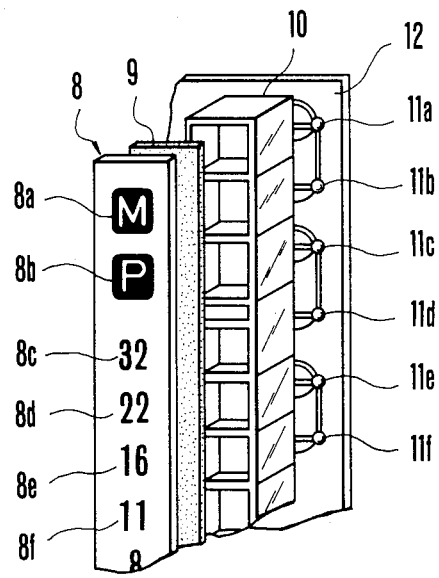
Figure 3:
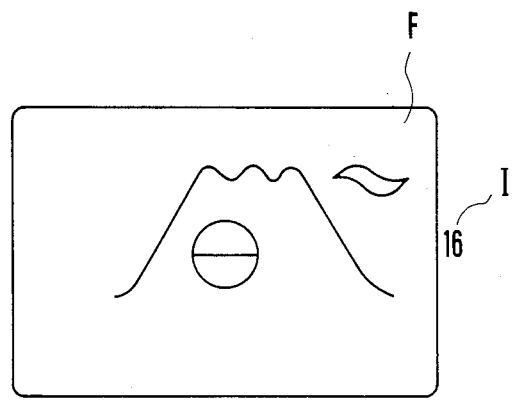
Figure 4:
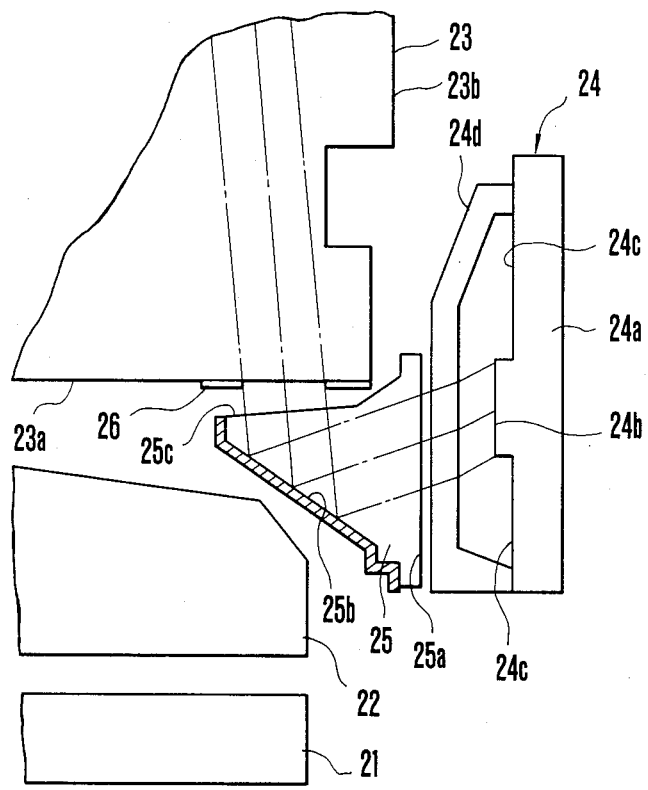
Figure 5:
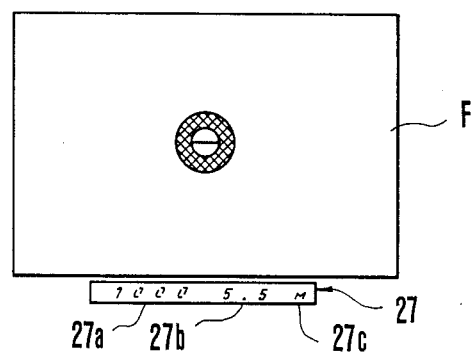
Figure 6:
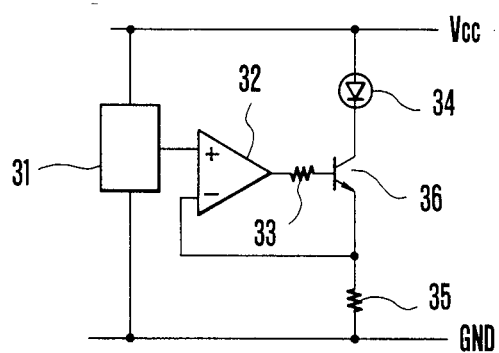
Figure 7:
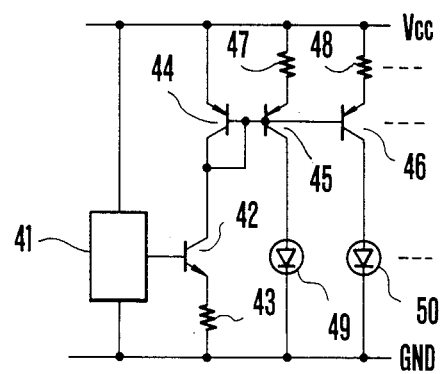

What is shown in FIG. 8 corresponds to the information display member A of FIG. 1.

Referring to FIG. 8, a display film 100 has information display marks 100a, 100b, 100c and 100d indicative of photography operation modes, etc. arranged thereon. Dot LED's 101a, 101b, 101c and 101d are wire bonded to the surface of a substrate 102 and respectively oppose the information display marks 100a, 100b, 100c and 100d. A shield plate 103 is around the dot LED's 101a, 101b, 101c and 101d to ensure that the light of each of the LED's 101a, 101b, 101c, and 101d does not leak to any of the information display marks 100a, 100b, 100c and 100d other than the corresponding mark. A diffusion tape 104 is between the display film 100 and the shield plate 103 to ensure that the light of the dot LED's 101a, 101b, 101c and 101d evenly illuminate corresponding display marks 100a, 100b, 100c and 100d. An LED 105, which has seven-segments for each of two numeral places and one dot monolithically formed therein, is wire bonded to the surface of the substrate 102. The above shield plate 103 is provided with holes 103a–103e, which are formed in places corresponding to the light emitting parts, and also prevents the light of the LED 105 from leaking to the above display film 100. For this purpose, the display film 100 and the diffusion tape 104 avoid the hole 103a. An IC 106 drives the LED's 101a–101d and 105 to light up as required. A flat cable 107 is provided for connecting the substrate 102 to another circuit of the camera (not shown).

Figure 9:
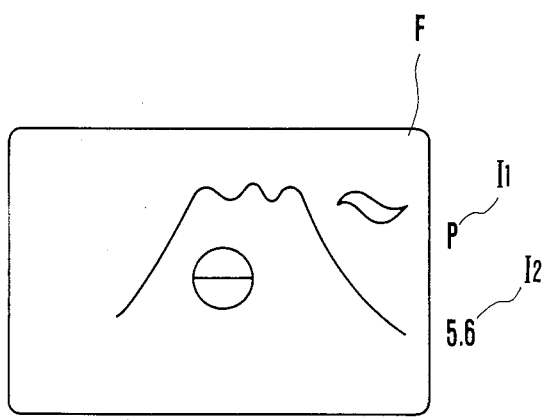

The operation of the embodiment which is arranged as described above operates as follows: Referring to FIG. 9 which shows a view finder visual field, when a program mode is selected from the selectable photography operation modes depending on photographing conditions, for example, the LED 101b emits a light to evenly illuminate a corresponding display mark P which stands for "program" with the emitted light limited by the shield plate 103 and diffused by the diffusion tape 104. The display information light, which is thus produced from the display mark 100b, comes from the bottom of a penta-Dach prism to be displayed as "P" as display information I1 on one side of the photography visual field F via an optical path which is similar to that of a photography field light. Furthermore, when an aperture value of the photo-taking lens 1 is determined by an electric circuit which will be described later herein, is the photographing information is determined based on to the photography conditions, for example, the seven-segment LED 105 emits a light to make a display "5.6". The light from the LED 105 then comes from the bottom surface of the penta-Dach prism 4, 23 to also be displayed as "5.6" and as display information I2 on the side of the photographing visual field F.

When a shutter speed priority mode is set by means of an external operation member (not shown), the LED 101c lights up to illuminating the display mark 101c which is "T". Meanwhile, the brightness of an object to be photographed is measured via a light receiving photo-sensitive element. Then, an aperture value, which is obtained through computation performed by an electric circuit which will be described later, is displayed by the seven-segment LED 105.

Figure 10:
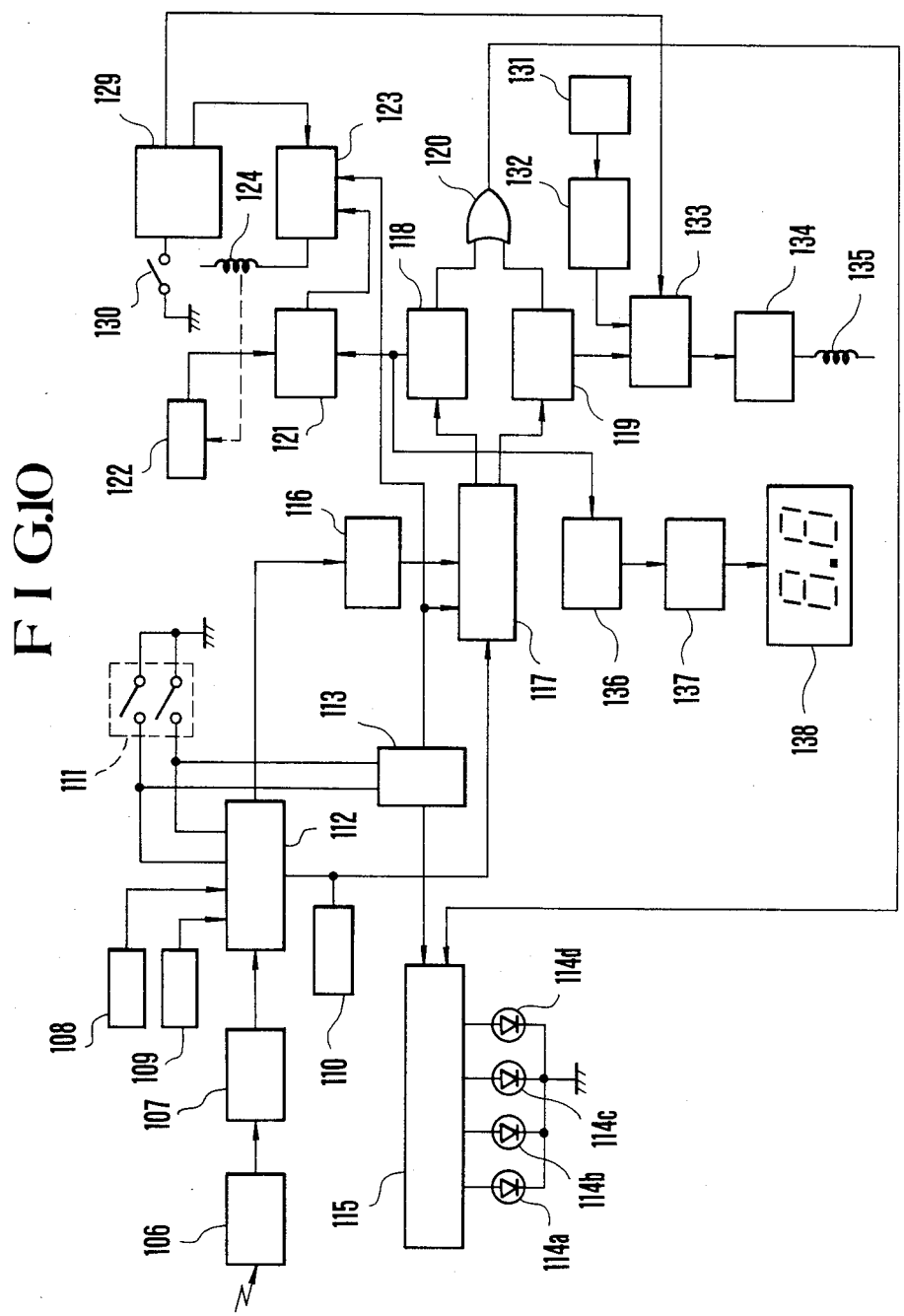

An example of an electric circuit required for operating the above display device is arranged as described below, referring to the block diagram of FIG. 10.

The block diagram includes a light measuring circuit 106 which photo-electrically converts the brightness of an object received through a lens, a prism, etc. by means of a photosensitive element such as a silicon photo cell (SPC) or the like. An A/D converter 107 repeatedly converts in a predetermined cycle the light measurement output voltage of the light measuring circuit 106 into a digital pulse number. A pulse code plate 108 is provided for film sensitivity information (ISO) and produces a pulse code corresponding to a film sensitivity value set at an ISO film sensitivity dial (not shown). A pulse code plate 109 for information on the maximum F-number of the lens produces a pulse code corresponding to the maximum F-number of the lens mounted on the camera. A shutter time information pulse code plate 110 produces a pulse code corresponding to a shutter time value set at a shutter time setting dial (not shown). A photography operation mode setting switch 111 is composed of a two-bit switch and permits selection of any of photography operation mode including manual (M), programed (P) and shutter priority (T) photographing modes or the like. An APEX computing circuit 112 digitally computes and produces information necessary for the photography mode set by the photography mode setting switch 111 by carrying out the computation on the basis of the object brightness information from the A/D converter 107 and the information values set at the pulse code plates 108, 109 and 110. A decoder 113 decodes the two-bit information of the mode setting switch 111 and selects one of the four-bit output lines that corresponds to the selected photography mode. An LED driving circuit 115 lights up display dot LED's 114a, 114b, 114c and 114d by supplying a current to them when applicable. The display dot LED's 114a, 114b, 114c and 114d respectively correspond to the dot LED's 101a, 101b, 101c and 101d shown in FIG. 8. A digital memory circuit 116 temporarily stores the output of the APEX computing circuit 112 at every predetermined recurrent period. A program control circuit 117 allocates, at the time of the programed photographing mode, an exposure information value (Ev value) obtained from the APEX computing circuit 112 via the digital memory circuit 116 to a shutter time information value (Tv) and an aperture information value (Av) in accordance with a prescribed program diagram. The outputs of the program control circuit 117 are supplied to an Av register 118 and a Tv register 119. In the shutter time priority photography mode, the shutter time information (Tv) from the shutter time information pulse code plate 110 and the computed exposure information (Ev) produced from the APEX computing circuit 112 are supplied directly to the Av register 118 and the Tv register 119. The Av register 118 and the Tv register 119 respectively store pulses corresponding to the aperture value and shutter speed information received from the program control circuit 117. Furthermore, they produce overflow outputs when the aperture value and the shutter time value are outside the control range such as when an excessively dark object is to be photographed. An OR gate 120 produces a high level output when either the Av register 118 or the Tv register 119 produces the overflow output. Then, the high level output of the OR gate 120 is supplied to the LED driving circuit 115. A coincidence circuit 121 supplies a signal to an aperture control circuit 123 when the digital value of an aperture pulse code plate 122 coincides with the value of the Av register 118. The aperture pulse code plate 122 produces a pulse signal which corresponds to the aperture value of the lens. The aperture control circuit 123 controls an aperture control magnet 124 on the basis of the signal received from the coincidence circuit 121 when the computed aperture value, which is stored at the Av register 118, coincides with the actual aperture value of the lens which is the set value of the aperture pulse code plate 122. Furthermore, when the manual photography mode is selected via the photography mode setting switch 111, a signal from the decoder 113 renders the aperture control circuit 123 inoperative, permitting thereby a manual adjusting operation on the aperture.

A release sequence circuit 129 instructs the aperture pulse code plate 122 to slide and the aperture control circuit 123 to operate when a release switch 130 turns on. In addition, the release sequence circuit 129 performs a sequential control over the various parts of the camera (not shown). The release switch 130 operates in response to the second stroke on a release button (not shown). The aperture control magnet 124 is controlled by the aperture control circuit 123 and coincides the aperture value of the lens with the computed aperture value by preventing the aperture pulse code plate 122 from sliding. A clock pulse oscillator 131 produces reference pulses. A frequency divider 132 frequency divides clock pulses produced from the clock pulse oscillator 131 into a predetermined frequency. A shutter time expanding circuit 133 expands the digital value of the Tv register 119 to a shutter time value on the basis of the output of the frequency divider 132. A shutter control circuit 134 controls a shutter driving magnet 135 based on the output of the shutter time expanding circuit 133. The shutter driving magnet 135 controls a shutter (not shown). A decoder 136 converts the digital value (a binary value) of the Av register 118 into a decimal value. A LED driving circuit 137 lights up a seven-segment LED 138 by supplying a current thereto based on the output of the decoder 136. The seven-segment LED 138 corresponds to the seven-segment LED 105 of FIG. 8 and displays an aperture value.

The electric circuit which is arranged as described above operates as follows: When the shutter button is depressed a first stroke, the power source supplies a current to each part of the circuit arrangement. The light measuring circuit 106 then produces a voltage corresponding to the brightness of the object to be photographed. This voltage is repeatedly A/D converted by the A/D converter 107 of FIG. 8 in a predetermined cycle. The voltage is thus converted into a pulse number. In other words, as to an APEX value, the number of pulses corresponds to a value $Bv-Avo$. This pulse number is respectively computed by the APEX computing circuit 112 together with the signals Sv and Avo produced from the film sensitivity information pulse code plate 108 and the lens' maximum F-number information pulse code plate 109. Through this computing operation, an exposure value Ev expressed as $(Bv-Avo)+Sv+Avo$ is obtained. In the programed photography mode, this value is used to obtain the values Tv and Av according to the prescribed program diagram in a manner further described later herein. In a shutter priority photography operation, the exposure value Ev thus obtained is further computed with the signal Tv of the shutter time information pulse code plate 110 ($Ev-Tv=Av$). Then a pulse signal corresponding to the value Av is produced from the APEX computing circuit 112.

The manner in which the above computation is accomplished according to the photography mode selected is determined by the photography mode setting switch 111. The pulse signal which is produced from the APEX computing circuit 112 according to the photography conditions and the photography mode is temporarily stored at the digital memory circuit 116. In the programed photography mode, this stored value is then used to determine the values Av and Tv according to a prescribed program diagram based on the stored value. The value signals Av and Tv are respectively supplied to the Av and Tv registers 118 and 119. Under the shutter priority photography mode, a number of pulses corresponding to the signal Tv produced from the shutter time information pulse code plate 110 is supplied to the Tv register 119 via the program control circuit 117. Meanwhile, a number of pulses corresponding to the value Av obtained by computing the object brightness, film sensitivity and shutter time is supplied to the various elements, one after another, in order, including the APEX computing circuit 112, the digital memory circuit 116, the program control circuit 117 and the Av register 118. If the values of the Av and Tv registers 118 and 119 are outside the control ranges of the shutter time and the aperture value, either one or both of the registers 118 and 119 produce overflow outputs. In that event, the OR gate 120, which serves as the detecting means, to produces a high level outputs.

The dot LED's 114a, 114b, 114c and 114d perform a display operation as follows: With one of the photography modes selected by means of the photography mode setting switch 111, the decoder 113 produces a signal from a selected output line. In response to this signal, the LED driving circuit 115 operates, lighting up one of the dot LED's 114a–114c. When the programed photography mode is selected, for example, the LED 114b lights up. If the selected mode is the manual photography mode, the LED 114a lights up. If the shutter time or aperture value is outside the control range as mentioned above, the high level signal from the OR gate 120 is impressed on the LED driving circuit 115. In that instance, the LED driving circuit 115 operates, lighting up the LED 114d giving a warning in addition to one of the other LED's 114a, 114b ad 114c. Further details of the operation of the LED driving circuit 115 will be described later herein.

The aperture control operation of the embodiment is as follows: When the release switch 130 turns on in response to the second depression stroke on the above release button, the release sequence circuit 129 instructs the aperture control circuit 123 to operate. In response to the instruction, power is supplied to the aperture control magnet 124. The aperture of the lens instantly shifts from full open toward a position with a smaller opening. In association with this aperture shift, the number of pulses of the aperture pulse code plate 122 changes. Since the pulse number of the aperture pulse code plate 122 corresponds to the aperture value of the lens, when the pulse number coincides with that of the Av register 118, the coincidence circuit 121 detects this coincidence and sends a signal to the aperture control circuit 123, cutting off the power to the aperture control magnet 124. With the power to the aperture control magnet 124 thus cut off, the lens aperture shift stops and the lens is fixed at that aperture value. Furthermore, the controlled aperture value obtained under the programed photography mode or the shutter priority photography mdoe and the aperture value of the lens to be set under the manual photography mode are displayed as follows: The binary code of the Av register 118 is converted into a decimal code by the decoder 136. The decimal code thus obtained is then displayed via the LED driving circuit 137 at the seven-segment LED 138.

Control over the shutter time is as follows: The shutter time expanding circuit 133 expands the pulse number of the Tv register 119 based on the frequency divider 132 output obtained by frequency dividing the reference clock pulses produced from the clock pulse oscillator 131. The expanded signal thus obtained is supplied to the shutter control circuit 134 thereby driving the shutter driving magnet 135. The shutter driving magnet 135 in turn controls the shutter (not shown).

Figure 11:
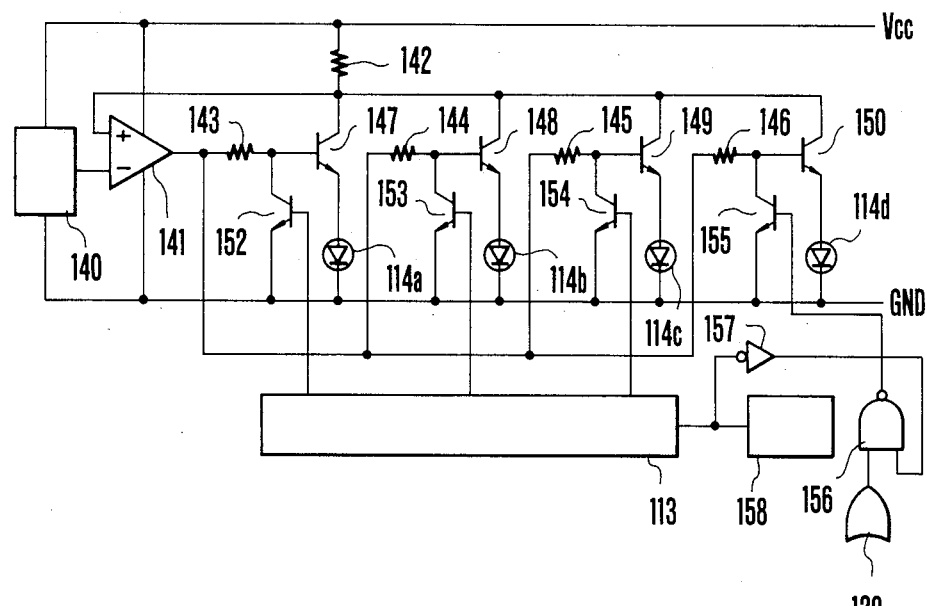

FIG. 11 shows, by way of example, the details of the above LED driving circuit 115. Referring to FIG. 11, a constant voltage circuit 140 is connected to the power source Vcc to producing a constant voltage. An operational amplifier 141 has the constant voltage of the constant voltage circuit 140 impressed on the inversion input terminal. A resistor 142 has one terminal thereof connected to the power source Vcc and the other to the non-inversion input terminal of the operational amplifier 141. Reference numerals 143, 144, 145 and 146 also identify resistors. Each of these resistors 143, 144, 145 and 146 has one terminal thereof connected to the output terminal of the operational amplifier 141. The other terminals of the resistors 143, 144, 145 and 146 are respectively connected to the bases of NPN transistors 147, 148, 149 and 150. The collectors of these NPN transistors 147, 148, 149, and 150 are all connected to the other terminal of the resistor 142. Meanwhile, the emitters of these NPN transistors 147, 148, 149 and 150 are connected to the anode terminals of the dot LED's 114a, 114b, 114c and 114d. Other NPN transistor 152, 153, 154 and 155 have their emitters connected to the ground GND and their collectors respectively connected to the bases of the NPN transistors 147, 148, 149 and 150. The bases of the NPN transistors 152, 153 and 154 are connected to the decoder 113. A NAND gate 156 has its input terminals connected to the OR gate 120 and an inverter 157 and its output terminal is connected to the base of the NPN transistor 155. The inverter 157 inverts the output of a pulse oscillator 158 which produces pulses in a predetermined cycle.

The LED driving circuit 115 which is arranged as described above, operates in the following manner: When a power supply switch (not shown) is depressed, a DC voltage is impressed between the power source Vcc and the ground GND. The constant voltage circuit 140 then produces a constant voltage, which is impressed on the inversion input terminal of the operational amplifier 141. The operational amplifier 141 has negative feedback applied thereto in such a way as to coincide the voltage of the non-inversion input terminal with that of the inversion input terminal. Then, the terminal of the resistor 142, which is not connected to the power source Vcc, has the same voltage as that of the output of the constant voltage circuit 140. In other words, a constant voltage, which is the difference between the voltage of the power source Vcc and the output voltage of the constant voltage circuit 140, is impressed on the two terminals of the resistor 142. As a result, a constant given current flows to the resistor 142.

Assuming that the NPN transistor 152 is non-conductive with its base potential at a zero level while the NPN transistors 153, 154 and 155 are all conductive with their base potential at a high level, the NPN transistors 148, 149 and 150 become non-conductive with no base currents supplied from their resistors 144, 145 and 146 as their base potentials are at a low level. Each of these NPN transistors 148, 149 and 150 has no current flow between the collector and emitter. The NPN transistor 147 solely becomes conductive. A constant current, which flows to the resistor 142, thus flows between the collector and the emitter of the NPN transistor 147. Accordingly, a constant current also flows to the LED 114a, which is connected to the emitter of the NPN transistor 147, lighting up the LED 114a. Likewise, a constant current flows to the LED 114b to light it up if the base potentials of the NPN transistors 152, 154 and 155 are at a high level and if the base potential of the NPN transistor 153 alone is at a low level. The operational amplifier thus causes a constant current to flow only to one of the plurality of LED's 114a, 114b, 114c.

The lighting up conditions of these LED's 114a, 114b, 114c are as follows: The level of only one of the outputs of the decoder 113 becomes low depending on the selected photography mode. The change to the low level only takes place when the output level of the pulse oscillator 158 becomes high. In other words, one of the LED's 114a, 114b and 114c intermittently lights up according to the time it takes for the pulse oscillator 158 output level to become high. Furthermore, as mentioned in the description of the operation of the electric circuit shown in FIG. 10, when either the shutter time or the aperture value is outside of the control range, i.e. in the event of a warning, the output level of the OR gate 120 becomes high. In that event, however, the output level of the NAND gate 156 becomes low only when the output level of the pulse oscillator 158 is low, causing a constant current to flow to the LED 114d. Accordingly, the LED 114d does not light up even at the warning time if any one of the LED's 114a, 114b and 114c is lit. The LED 114d lights up in the event of a warning only when none of the LED's 114a and 114c are lit. If the recurrent output cycle of the pulse oscillator 158 is sufficiently short, the LED 114d and one of the LED's 114a, 114b and 114c appear to be simultaneously lit up because of the eye after image effect.

Figure 12:
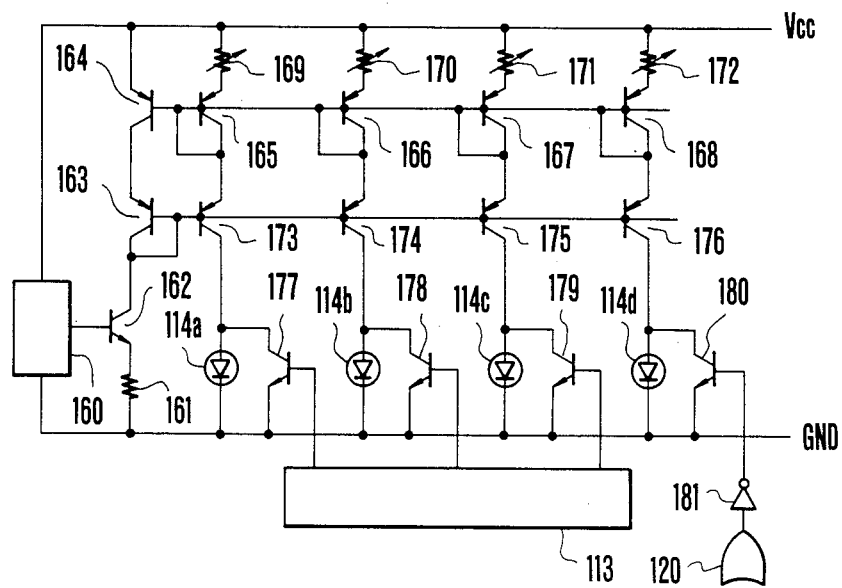

FIG. 12 is a circuit diagram showing the details of another example of the LED driving circuit 115. In this situation, a constant voltage circuit 160 is connected between the power source Vcc and the ground GND and produces a constant voltage. A resistor 161 has its one terminal grounded. An NPN transistor 162 has the constant voltage of the constant voltage circuit 160 impressed on its base and has the other terminal of the resistor 161, which is not grounded, connected to its emitter. A PNP transistor 163 has its base and collector interconnected and is also connected to the collector of the above NPN transistor 162. A PNP transistor 164 has its emitter connected to the power source Vcc and its collector is connected to the emitter of the above PNP transistor 163. Each of the other PNP transistors 165, 166, 167 and 168 has its base is and collector interconnected and its base is connected in common with the PNP base of the transistor 164. Each variable resistor 169, 170, 171 and 172 has one terminal thereof connected to the emitter of one of the corresponding PNP transistors 165, 166, 167 and 168 while the other terminal thereof is connected to the power source Vcc. PNP transistors 173, 174, 175 and 176 have their bases connected in common with the base of the PNP transistor 163 and their emitters are respectively connected to the collectors of the PNP transistors 165, 166, 167 and 168 while their collectors are respectively connected to the anodes of the LED's 114a, 114b, 114c and 114d. NPN transistors 177, 178, 179 and 180 have their emitters grounded and their collectors connected respectively to the collectors of the PNP transistors 173, 174, 175 and 176. The bases of the NPN transistors 177, 178 and 179 are connected to the decoder 113. However, the base of the NPN transistor 180 is connected to the output terminal of an inverter 181. The input terminal of the inverter 181 is connected to the output terminal of the OR gate 120.

With the LED driving circuit 115 arranged as described above, it operates in the following manner: When a power supply switch (not shown) turns on, a DC voltage is impressed between the power source Vcc and the ground GND. The constant voltage circuit 160 produces a constant voltage. The constant voltage is impressed on the base of the NPN transistor 162. Assuming that a voltage between the base and the emitter of the NPN transistor 162 is nearly constant, a constant voltage is impressed on the two terminals of the resistor 161. A constant current then flows to the resistor 161 and a constant current thus flows between the collector and the emitter of the NPN transistor 162. This constant current also flows to the PNP transistors 163 and 164. Then, the voltage between the base and the emitter of each of the PNP transistors 163 and 164 corresponds to the constant current flowing to the collector of the NPN transistor 162. Since the bases of the PNP transistors 164, 165, 166, 167 and 168 are connected in common, each has the same voltage between the power source Vcc and the base. Furthermore, since the PNP transistors 165, 166, 167 and 168 have the variable resistors 169, 170, 171 and 172 connected to their emitters, a constant current flows between the collector and the emitter of each of these PNP transistors 165, 166, 167 and 168 based on the resistance value of the corresponding variable resistor. For example, assuming that the collector currents of the PNP transistors 164 and 165 are I1 and I2 and the resistance value of the variable resistor 169 is R, the following relation is obtained:

$$\frac{kT}{q} \ln \frac{I1}{IS} = \frac{kT}{q} \ln \frac{I2}{IS} + I2R$$

Therefore, the value of I2 obtainable from $$\frac{kT}{q} \ln \frac{I1}{I2} = I2R$$

is determined by I and R. I1=I2 if R=0.

The collector currents of the transistors 165, 166, 167 and 168 are respectively supplied via the transistors 173, 174, 175 and 176 to the LED's 114a, 114b, 114c and 114d if the transistors 177, 178, 179 and 180 are non-conductive.

Having selected the photography mode, when the output line of the decoder 113 is operating with the bases of the transistors 178 and 179 at a high level and those of the transistorr 177 solely at a low level, a constant current from the transistor 173 flows to the LED 114a lighting it up. Meanwhile, the constant currents from the transistors 174 and 175 flow to the transistors 178 and 179 and do not light up the LED's 114b and 114c.

In the event of a warning, the OR gate 120 output level becomes high in the same manner as in the embodiment shown in FIG. 11. Accordingly, the inverter 181 output level becomes low to rendering the transistor 180 non-conductive. Then, a constant current produced from the transistor 168, based on the resistance value of the variable resistor 172, flows via the transistor 176 to the LED 114d lighting it up.

The reason for arranging the current, which is the same as the collector current of the transistor 164 to be supplied to the LED's 114a, 114b, 114c, and 114d by using the variable resistors 169, 170, 171 and 172, lies in that: Unevenness in the characteristics of the LED's 114a, 114b, 114c, and 114d results in various quantities of light emitted from these LED's 114a, 114b, 114c, and 114d even when they receive the same current. Therefore, such variations of the LED's 114a, 114b, 114c, and 114d are thus absorbed by variations of the current.

Variations in the currents flowing to the LED's 114a, 114b, 114c, and 114d in relation to variations in the voltage between the power source Vcc and the ground GND are as follows: The constant current which is determined by the constant voltage circuit 160, the resistor 161 and the transistor 162 flows via the transistor 163 to the transistor 164. The voltage between the base and emitter of the transistor 164 corresponding to this constant current is changed by a voltage between the collector and the emitter due to the Early effect (or a base width modulation effect). Meanwhile, however, the collector voltage of the transistor 164 is kept nearly constant by the emitter of the transistor 163 (the emitter voltage of the transistor 163 is determined by the base voltage and the base voltage which is the same as those of the transistors 173, 174, 175 and 176 and is determined by the collector voltage, i.e. the base voltage of the transistor 164). Therefore, the voltage between the base and the emitter of the transistor 164 becomes almost unvarying for the above constant current quantity and is not relative to the power source voltage. Therefore, the transistors 165, 166, 167 and 168, which are diode connected, also have constant currents flowing thereto regardless of the power source voltage. The currents from the transistors 165, 166, 167 and 168 are supplied via the transistors 173, 174, 175 and 176 to the LED's 114a, 114b, 114c and 114d as constant currents regardless of the power source voltage if their DC current amplification rate is sufficiently high.

In accordance with the invention as has been described in the foregoing, a compact display device can be prepared at a low cost with the display film 8, which is to be illuminated by dot LED's 11a–11f, on the same substrate 12 as the seven-segment LED 24b and with many kinds of information displayed within a view finder by selectively using these LED's 11a–11f according to applicable photography information.

FIGS. 13 to 23 show a further embodiment of the invention. The feature of the embodiment is as follows: In an automatic exposure control camera having an external display arrangement for displaying an exposure information setting value, etc. and a view finder display arrangement for displaying a computed exposure value, etc., there is provided a display arrangement which cancels the exposure information setting value of the external display device. It also allows the computed exposure value to be displayed in a photography operation mode in which an actual stopped down aperture has priority. Another display arrangement extinguishes the view finder display and also cancels the exposure information setting value of the external display device when the eyepiece shutter of the camera is closed.

Figure 13:
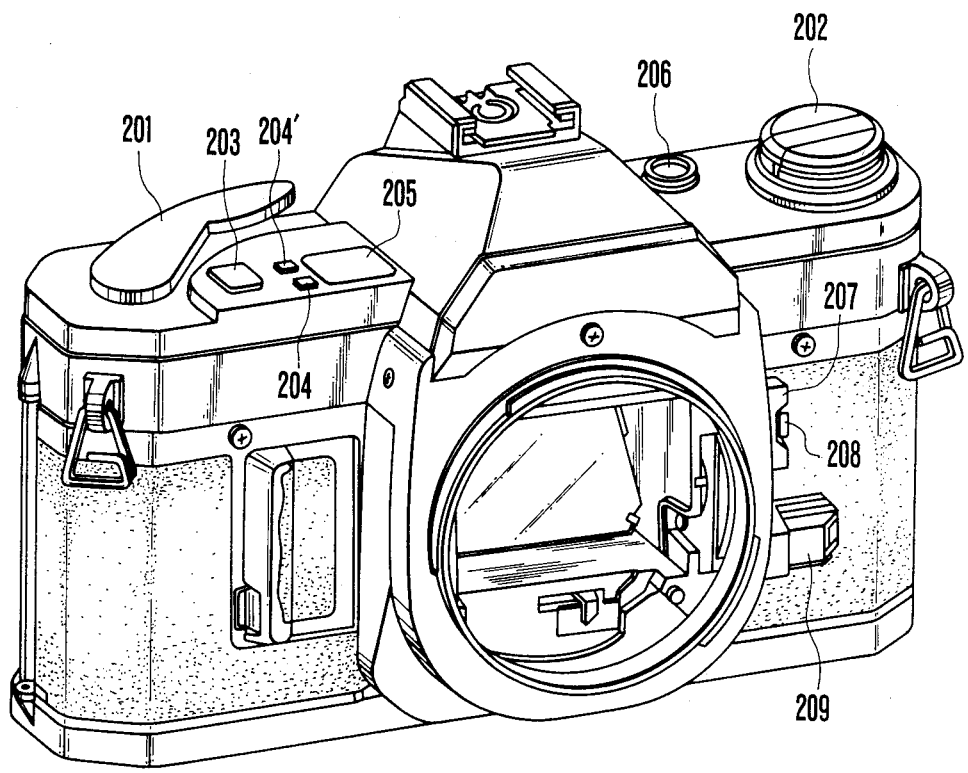

FIG. 13 is an oblique view showing the appearance of a single-lens reflex camera excluding a lens barrel thereof. Referring to FIG. 13, a film winding lever 201 and a film rewinding knob 202 are disposed on the upper opposite ends of the camera body. On the upper surface of the camera body on the side of the above film winding lever 201 are provided a shutter release button 203, operation buttons 204 and 204' and a display window 205, while a safety button 206 is also provided on the upper surface of the camera body on the side of the rewinding knob 202. Reference numeral 207 identifies a knob for shifting an exposure information setting value. With a preparation button 208 pushed, which is provided as a safety device, the setting value can be shifted from one value to another by operating the shift knob 207. The above operation button 204 is provided for selection of a photography mode. When this operation button 204 is depressed while also depressing the safety button 206, the marks for various photography modes appear and change, from one to another, with a time lapse. These marks of photography modes an observable through the display window 205. An other operation button 204' is for setting the film sensitivity value. When the operation button 204' is depressed while pushing the safety button 206, marks for various film sensitivity values change, from one to another, as the time elapses. This is also observable through the display window 205. The above shift knob 207 is provided for setting exposure information which has priority over others. With the preparation button 208 pushed, when the shift knob 207 slides, marks for the setting value of the exposure information change, from one to another, with time and this change is also observable through the display window 205. In the shutter priority mode or the manual photography mode, the shutter speed or time can be set in this manner. In the aperture priority mode, a desired aperture value can be set. However, setting cannot be accomplished by means of this knob 207 in the event of the programed photography mode and the actual stopped down aperture priority mode. Furthermore, a reference numeral 209 identifies a stopping down button.

Figure 14:
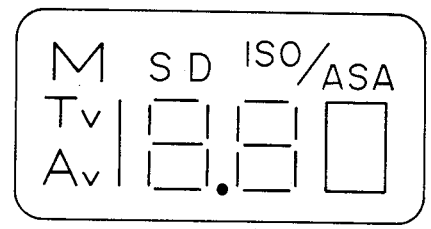

FIG. 14 shows a pattern displayed within the display window 205. The pattern is formed by means of an electro-optical element such as a liquid crystal. The drawing shows it totally lit up. Actually, however, the display varies with the selected photography mode and the condition of the camera. In other words, the photography modes to be displayed include the shutter priority mode which is denoted by "Tv", the aperture priority mode which is denoted by "Av", the manual photography mode which is denoted by "M" and the stopped-down actual aperture priority mode "SD". The shutter time under the shutter priority mode and the aperture value under the aperture priority mode are denoted by the numeral portion "18.80" of the display pattern. Furthermore, when the film sensitivity value is set, the film sensitivity value is also displayed at the above numeral portion with a mark "ISO" or "ASA".

Meanwhile, the computed exposure value is as will displayed within the view finder in a manner as will described later.

Figure 15:
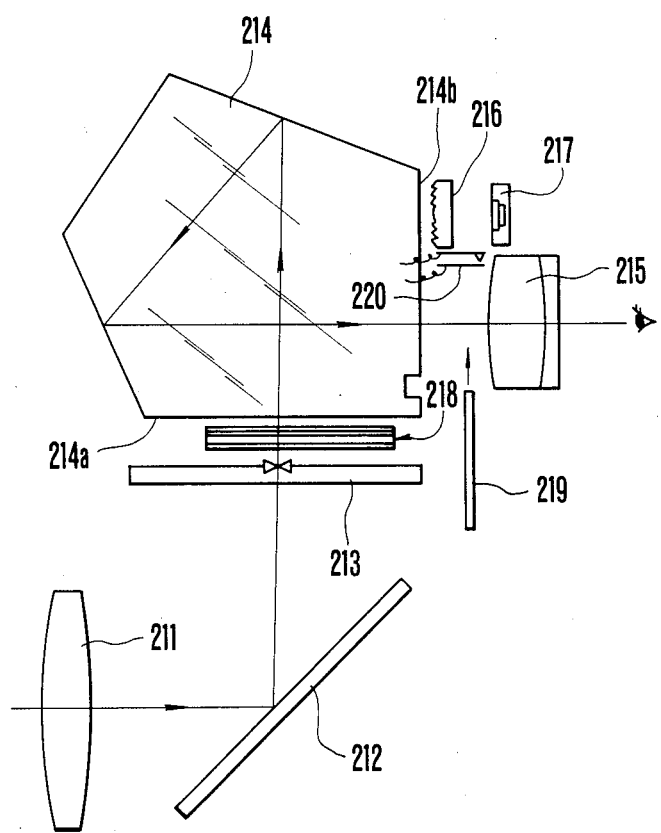
Figure 16:
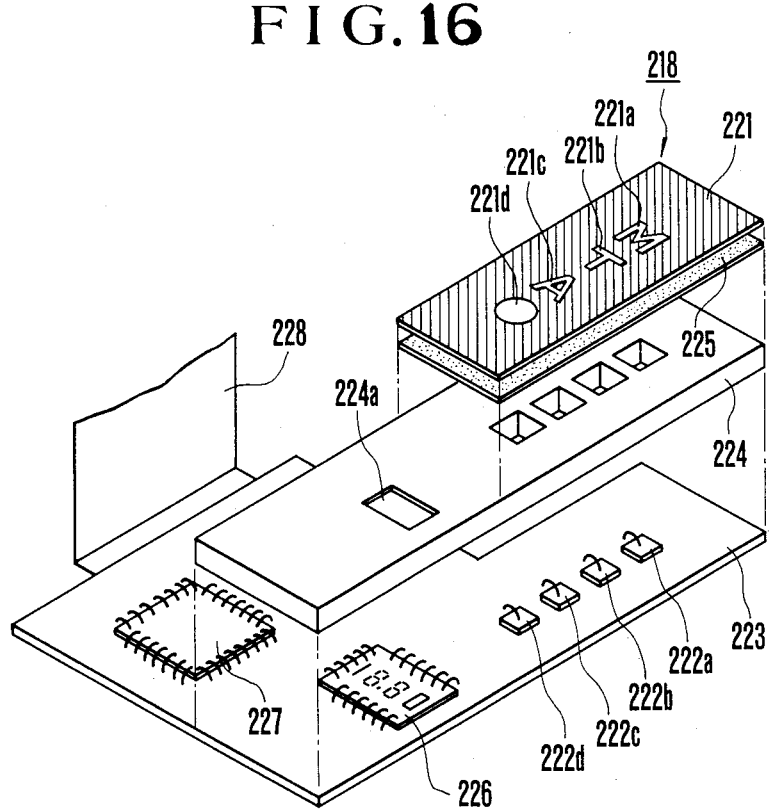

FIG. 15 is a schematic illustration of the optical system of the camera based on the embodiment of the invention. FIG. 16 is an enlarged exploded view showing the details of the information display member 218 shown in FIG. 15.

The arrangement of FIGS. 15 and 16 is identical to those shown in FIGS. 1 and 8 and thus requires no further description.

Figure 17:
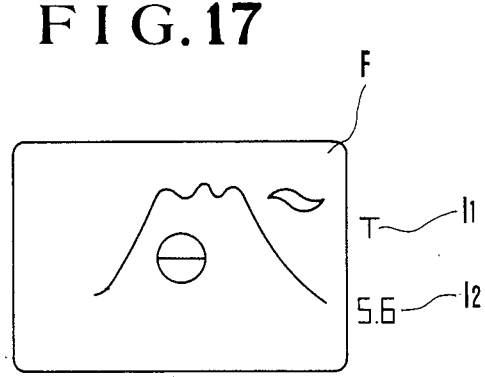

The display operation for display within the view finder of the embodiment, which is arranged as described above, is as follows: Among the selectable photography operation modes, when the shutter priority mode is selected, for example, an LED 222b lights up. The light of the LED 222b is limited by a shield plate 224 and is diffused by a diffusion tape 225. The diffused light evenly illuminates a corresponding display mark 221b of a display film 221 which is "T" in this instance. The display information light from the display mark 221b enters a penta-Dach prism 214 from its bottom 214a and is displayed, via the same optical path as a photographing field light, on one side of the photographing field F of the view finder, as display information I1 the letter "T", as shown in FIG. 17. This informs the photographer that the camera is in the shutter priority mode.

Furthermore, among photography information values that are to be determined based on photographing conditions, an aperture value of the photo-taking lens 1, for example, is determined by an electric circuit which will be described later. This aperture value is displayed by means of the seven-segment pattern of an LED 226 with light emission, for example, as "5.6". Then, in the same manner as described above, the light of the LED 226 enters the penta-Dach prism 214 from the bottom surface 214a. The light is then displayed as display information I2 which in this instance is "5.6" below the above display information I1 on the same side of the photography field F, as shown in FIG. 17.

Figures 18, 19, 20:
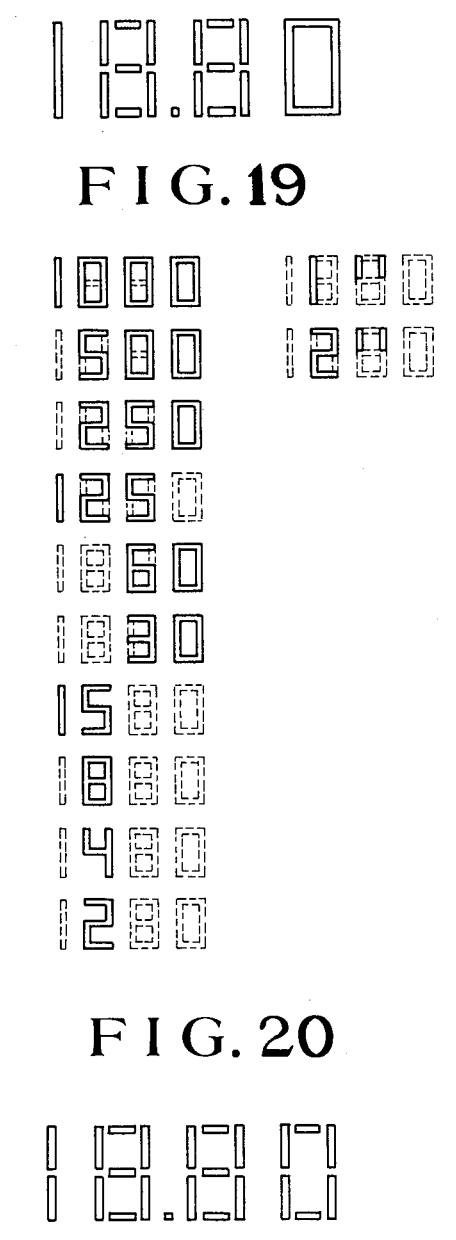

When the aperture priority mode is selected, an LED 222c lights up. The light of the LED 222c evenly illuminates a display mark 221c of the display film 221 which is "A" this time and the letter "A" is displayed within the view finder informing the photographer of the selection of the aperture priority mode. The brightness of an object to be photographed is measured by a light receiving photo-sensitive element 217. A shutter time value is computed by an electric circuit which will be described later. The computed shutter time value is displayed by means of the four place pattern of the LED 226. This computed shutter time value displayed under the aperture priority mode is generally one of the numerals shown in FIG. 19, wherein the numerals in the left column represent shutter time values below 1 sec while those in the right column represent time values above 1 sec. Therefore, the display pattern of the LED 226 has each of the highest place "1" and the lowest place "0" formed by one-segment. Furthermore, in forming the LED 226, it is possible to make the brightness of segments uniform by equalizing the current density of the segments. Furthermore, in order to provide uniformity the appearance of the places of "1" and "0" with that of other places, each may be divided into a plurality of segments instead of one, as shown in the pattern of FIG. 20.

In the camera having an external and internal display arrangement mentioned in the foregoing, when the stopping-down button 209 is pushed, an automatic stop lever (not shown) operates stopping down the lens aperture. Then, concurrently, the camera is shifted to the stopped-down actual aperture priority mode. In this mode, it is only the part "SD" that lights up among others within the external display pattern shown in FIG. 14. Meanwhile, all the mode displays within the view finder are put out.

Under this condition, when the shutter release button 203 is depressed a first stroke, the light measuring circuit operates. Then, a computed shutter time value for the actual aperture is displayed within the view finder by the LED 226 of the view finder display arrangement 218. At the same time, the computed shutter time value is displayed by using the four-place display part within the pattern of the external display arrangement of FIG. 14. In the stopped-down actual aperture priority mode, the eyepiece is closed by means of an eyepiece shutter 219 or the like to lessen light measurement error due to view finder reverse incident light coming via the eyepiece. In other words, although no view finder display is observable in this case, this display by the external display arrangement permits the photographer to observe the computed shutter time value through the display window 205.

Figure 21:
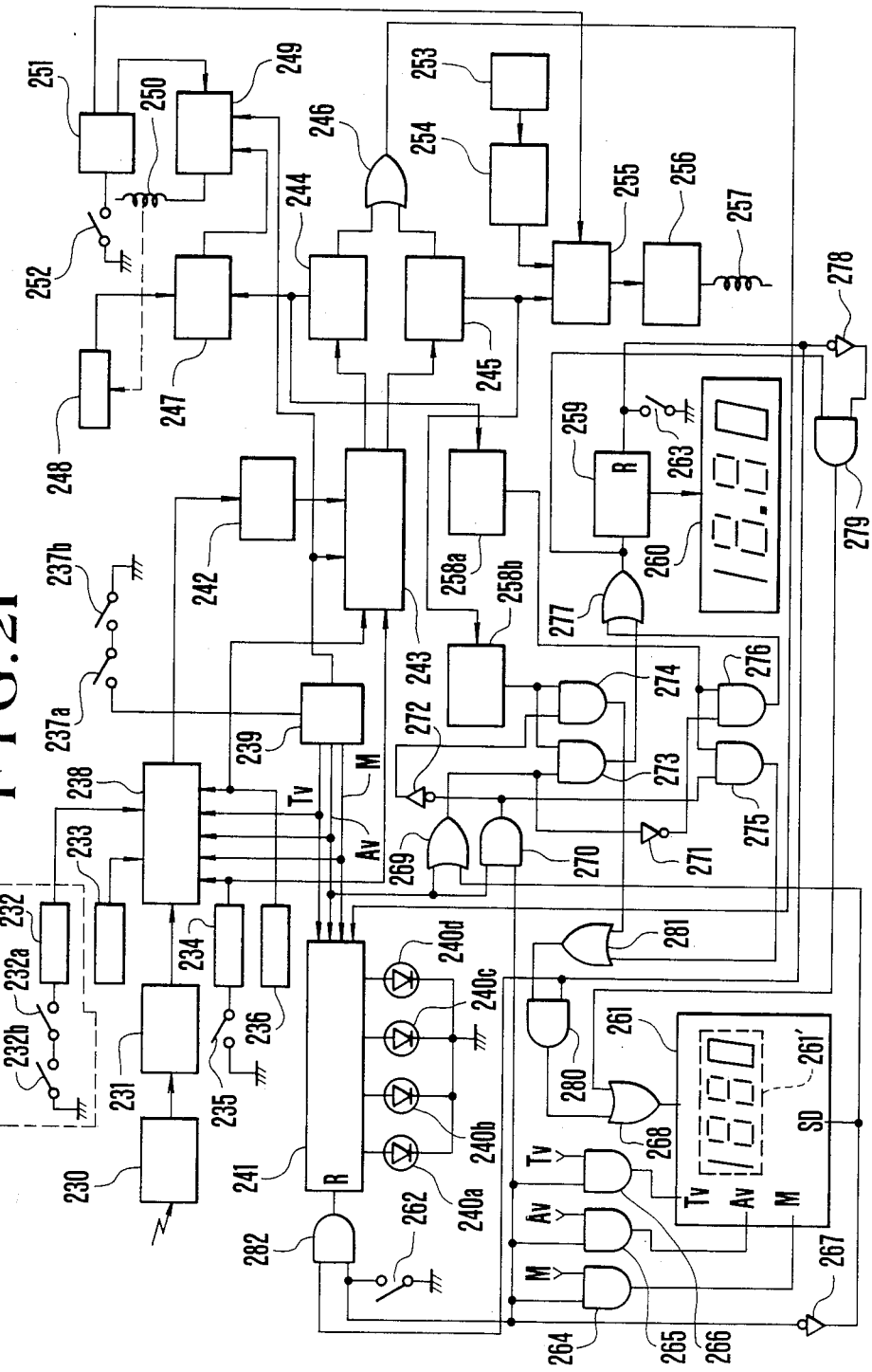

FIG. 21 shows, by way of example, an electric circuit required for operating the display arrangement 218 described. Referring to FIG. 21, a light measuring circuit 230 photo-electrically converts the object brightness coming through the lens, the prism 214, etc. by means of a light receiving photo-sensitive element 217 such as SPC (silicon photo-cell) or the like. An A/D converter 231 repeatedly converts a photo-metric output voltage of the light measuring circuit 230 into a digital pulse number in a predetermined cycle. A film sensitivity (ISO) setting circuit 232 produces a pulse code corresponding to a film sensitivity value set by operating the safety button 206 and the operation button 204'. With the safety button 206 depressed, a safety switch 232a is closed. Then, with the operation button 204' depressed, a film sensitivity setting switch 232b is closed, rendering the film sensitivity setting circuit 232 operative. More specifically, the setting circuit 232 consists of a one-shot circuit, a timer circuit, a counter, etc. With the safety switch 232a closed, the film sensitivity setting switch 232b is shifted from open state to closed. Then, the one-shot circuit produces one-shot pulses. The counter counts the one-shot pulses. The film sensitivity value is set based on the pulse count number. If the film sensitivity setting switch 232b is kept closed, the timer circuit produces pulses at predetermined time intervals and then the counter also counts the number of pulses produced from the timer circuit besides the above one-shot pulses. Therefore, a film sensitivity value can also be set by opening the film sensitivity setting switch 232b when the count value of the pulses from the timer circuit reaches the desired film sensitivity value. A lens maximum opening F-number information pulse code plate 233 produces a pulse code corresponding to the maximum F-number of the lens to be mounted on the camera. A shutter time information setting circuit 234 produces a pulse code corresponding to a shutter time value set based on a length of time during which an information setting switch 235 is kept closed by an operation performed on the shift knob 207 of FIG. 13. An aperture information setting circuit 236 produces a pulse code corresponding to an aperture value likewise set based on a length of time during which the information setting switch 235 remains closed. A safety switch 237a is interlocked with the above safety switch 232a and closes when the safety button 206 is depressed. A photography mode setting switch 237b closes when the operation button 204 of FIG. 13 is pushed. An APEX computation circuit 238 performs digital computation and produces information necessary for the photography mode selected by the photography mode setting switch 237b with the digital computation being performed on the basis of information on the object brightness obtained respectively from the A/D converter 231 and setting information values produced from the film sensitivity setting circuit 232, the maximum F-number information pulse code plate 233, the shutter time information setting circuit 234 and the aperture information setting circuit 236. A photography mode setting circuit 239 selects one of its output lines corresponding to one of the selectable photography modes including the shutter priority mode (Tv), the aperture priority mode (Av) and the manual mode (M) and make the level of the selected output line high. This photography mode setting circuit 239 comprises a one-shot circuit, a timer circuit, a counter, a decoder, etc. When the photography mode setting switch 237b is shifted from open to closed with the above safety switch 237a closed, the one-shot circuit produces one-shot pulses. The one-shot pulses are counted by the counter. The count value is decoded by the decoder. Then, one of the output lines of the decoder is selected and the level of the selected output line becomes high. In other words, the desired photography mode can be selected by repeatedly opening and closing the photography mode setting switch 237b. Furthermore, if the photography mode setting switch 237b is kept closed, the timer circuit produces pulses at predetermined time intervals and then the counter also counts the number of pulses thus produced from the timer circuit along with the number of one-shot pulses. Therefore, the photography mode can also be set by opening the setting switch 237b when the desired photography mode is set while the photography mode setting switch 237b is closed. A LED driving circuit 241 causes the display dot LED's 240a, 240b, 240c and 240d to light up by supplying an applicable current to each of them. When a low level input is impressed on the reset terminal R of the LED driving circuit 241, it stops operating and none of the display LED's 240a, 240b, 240c and 240d light up. These display LED's 240a, 240b, 240c and 240d respectively correspond to the LED's 222a, 222b, 222c and 222d. A digital memory circuit 242 temporarily stores the output of the APEX computation circuit 238 at predetermined intervals. A data selector 243 supplies the information (or computed value) produced from the APEX computation circuit 238 via the digital memory circuit 242 and the shutter time information set by the shutter time information setting circuit 234 or the aperture value information set by the aperture information setting circuit 236 to an Av register 244 and a Tv register 245 based on the photography mode. For example, under the shutter priority photography mode, the shutter time information (Tv) from the shutter time information setting circuit 234 and the computed information (Ev) of the APEX computation circuit 238 are respectively supplied to the Av register 244 and the Tv register 245. The Av register 244 and the Tv register 245 then store pulses corresponding to the aperture value information and the shutter time information from the data selector 243. They produce overflow outputs when the aperture value and the shutter time value deviate from a control range when the object to be photographed has a low brightness. When either the Av register 244 or the Tv register 245 produces an overflow output, an OR gate 246 produces a high level signal and supplies it to the LED driving circuit 241. A coincidence circuit 247 gives a signal to an aperture control circuit 249 when the content of the Av register 244 coincides with the digital value of an aperture pulse code plate 248. The aperture pulse code plate 248 produces pulses corresponding to the lens aperture value. The aperture control circuit 249 controls an aperture control magnet 250 on the basis of a signal produced from the coincidence circuit 247 when the computed aperture value, i.e. the content of the Av register 244 coincides with the actual aperture value of the lens, i.e. the content of the aperture pulse code plate 248. In response to the above control, the aperture control magnet 250 stops the siding movement of the aperture pulse code plate 248 causing the aperture value of the lens to coincide with the computed aperture value. Furthermore, when the manual photographing mode is selected by means of the photography mode setting switch 237b, a signal is produced from the photography mode setting circuit 239, rendering the aperture control circuit 249 inoperative permitting manual aperture adjustment. A release sequence circuit 251 instructs the aperture pulse code plate 248 to slide and the aperture control circuit 249 to operate when a release switch 252 is closed. In addition, the release sequence circuit 251 performs sequential control over various parts of the camera (not shown). The release switch 252 operates in response to the second depression stroke on the shutter release button (not shown). A clock pulse oscillator 253 produces reference pulses. A frequency divider 254 frequency divides clock pulses produced from the clock pulse oscillator 253. A shutter time expansion circuit 255 expands the digital value of the Tv register 245 into a shutter time value on the basis of the frequency divider 254 output. A shutter control circuit 256 controls a shutter driving magnet 257 based on the output of the shutter time expansion circuit 255. The shutter driving magnet 257 controls a shutter (not shown). Decoders 258a and 258b convert the digital values (binary) of the Av register 244 and the Tv register 245 into segment display codes for a LED 260 and a liquid crystal 261' provided for external display. A LED driving circuit 259 is arranged to supply a current to the LED 260 lighting up the LED 260 making a display on the basis of the outputs of the decoders 258a and 258b. The reset terminal R of the LED driving circuit 259 is connected to a switch 263. The LED driving circuit 259 stops operating and no display is made by the LED 260 when the switch 264 closes, impressing a low level input on the terminal R of the circuit 259. The LED 260 corresponds to the LED 226 shown in FIG. 16 and displays an aperture value and a shutter time value. An external display arrangement 261 is composed of a liquid crystal or the like and arranged displays a photography mode, a shutter time value, and an aperture value as shown in FIG. 14. A portion 261' of the external display displays the shutter time value and the aperture value and is composed of the liquid crystal consisting of the same segments as in the LED 260. A stop-down switch 262 has one terminal thereof connected to the terminal R of the LED driving circuit 241, while the other terminal is grounded. The switch 262 closes in response to depressing the stop-down button 209 shown in FIG. 13. Another switch 263, which is mentioned in the foregoing, corresponds to the switch 220 of FIG. 15 and closes when the eyepiece shutter 219 is closed. AND gates 264, 265 and 266 have their output terminals respectively connected to the electrodes of the display parts "M", "AV" and "Tv" of the external display arrangement 261, their common input terminals to the switch 262 and their other input terminals respectively to the terminals M, Av and Tv of the photography mode setting circuit 239. An inverter 267 has its output terminal connected to the electrode of "SD" of the external display device 261. An OR gate 268 has its output terminal connected to the electrode of the liquid crystal 261'. Arranged are OR gates 269, 277 and 281; AND gates 270, 273, 274, 275, 276, 279, 280 and 282; and inverters 271, 272 and 278.

The decoders 258a and 258b are for displays by the LED 260 and the liquid crystal 261' and are, therefore, provided with the same number of output lines as the number of segments of the LED 260 and the liquid crystal 261', although the block diagram of FIG. 21 gives a simplified illustration of this arrangement. Actually, therefore, the AND gates 273, 274, 275 and 276 are connected to the decoders 258a and 258b, the OR gates 277 and 281 are connected to the output terminals of the decoders 258a and 258b and the AND gates 279 and 280 are also connected to the output terminals and in the same numbers as the number of segments of the LED 260 and those of the liquid crystal 261'.

The electric circuit arranged as described above operates as follows: The first depression stroke of on the release button 203 shown in FIG. 20 closes a power supply switch (not shown). A current is supplied from the power source to each of the applicable parts. The light measuring circuit 230 produces a voltage corresponding to the brightness of the object to be photographed. The voltage is repeatedly A/D converted in a predetermined cycle by the A/D converter 231. The voltage is thus converted into a pulse number. In other words, for an APEX value, a pulse number corresponding to $Bv-Avo$ is produced. This pulse number is computed by the APEX computation circuit 238 with a signal Sv produced from the film sensitivity setting circuit 232 and a signal Avo produced from the maximum F-number information pulse code plate 233. Then, a value $(Bv-Avo)+Sv+Avo$ is obtained as a value Ev. The value Ev thus obtained is further computed with a signal Tv produced from the shutter time information setting circuit 234 or a signal Av from the aperture pulse code plate 248 based on the photography mode. Under the shutter priority mode, for example, the value Ev is computed with the signal Tv of the shutter time information setting circuit 234 ($Ev-Tv=Av$) and a pulse number corresponding to a computed value Av thus obtained is produced from the APEX computation circuit 238. The computation content based on the photography mode is determined by the safety switch 237a and the photography mode setting switch 237b. The pulse number produced from the APEX computation circuit 238 based on photography conditions and the photography mode is temporarily stored at the digital memory circuit 242. The stored value is transferred to the data selector 243. Under the shutter priority mode, for example, a pulse number corresponding to the signal Tv from the shutter time information setting circuit 234 is supplied via the data selector 243 to the Tv register. In the meantime, a pulse number corresponding to a computed aperture value Av computed from the object brightness, film sensitivity and shutter time is transferred as follows: APEX computation circuit 238→digital memory circuit 242→data selector 243→Av register 244. When these values received by the Av and Tv registers 244 and 245 are outside an aperture value and shutter time control range, either one of or both of the registers registers 244 and 245 produce overflow outputs, producing a sign output level are at the OR gate 246.

The display operation of the dot LED's 240a, 240b, 240c and 240d is as follows: With a photography mode set by means of the safety switch 237a, the photography mode setting switch 237b and the photographing mode setting circuit 239, one of the output lines Tv, Av and M of the photography mode setting circuit 239 is selected based on the set photography mode. A high level signal is at the selected output line. This signal causes the LED driving circuit 241 to operate lighting up the applicable dot LED 240a, 240b, 240c or 240d. If the shutter priority photography mode is selected, for example, the LED 240b lights up. The LED 240c lights up when the aperture priority photography mode is selected. Furthermore, in the event of a shutter time value or an aperture value deviating from the control range as mentioned above, the high level signal from the OR gate 246 is impressed on the LED driving circuit 241, lighting up the LED 240d giving a warning in addition to the lighting up action of one of the other LED's 240a, 240b and 240c. The detailed circuit arrangement of the LED driving circuit 241 is similar to the circuits shown in FIGS. 11 and 12.

An an aperture control operation is as follows: The release switch 203 closes in response to the second depression stroke on the release button 203. Then, the release sequence circuit 251 instructs the aperture control circuit 249 to operate. In accordance with this instruction, power is supplied to the aperture control magnet 250. The aperture of the lens then shifts from full open toward the smallest opening. The aperture pulse code plate 248 pulse number then varies corresponding to the the aperture shift. Since the aperture pulse code plate 248 corresponds to the aperture value of the lens, when the pulse number thereof coincides with the pulse number of the Av register 244, the coincidence circuit 247 detects it and sends a signal to the aperture control circuit 249, cutting off power to the magnet 250. With the power supply cut off, the aperture of the lens stops and the lens is fixed at that aperture position.

Shutter time control is performed as follows: The shutter time expanding circuit 255 expands the pulse number of the Tv register 245 on the basis of the output of the frequency divider 254 obtained by frequency dividing the reference clock pulses produced from the clock pulse oscillator 253. An expanded signal thus obtained is used to drive the shutter driving magnet 257 via the shutter control circuit 256. The magnet 257 then controls the shutter (not shown).

The display operation of the LED 260 and the liquid crystal 261' is as follows: First, if either the shutter priority photography mode or the manual photography mode is selected through the safety switch 237a, the photography mode setting switch 237b and the photography mode setting circuit 239 and if the aperture of the lens is not stopped down while the eyepiece 215 is left open. Under this condition, the level of either the output line Tv or the output line M becomes high among the output lines of the photography mode setting circuit 239. Then, the stop-down switch 262 and the switch 263 are open. Therefore, the output level of the OR gate 269 is low and that of the AND gate 270 is also low. This renders the LED driving circuit 241 operative, lighting up either of the LED's 240b and 240c. Since the level of the common input to the AND gates 264, 265 and 266 is high, the output level of either of the AND gates 264 or 266 becomes high to, displaying "TV" or "M" at the external display arrangement 261. Meanwhile, the content of the Av register 244 is decoded by the decoder 258a and is impressed on the input terminals of the AND gates 275 and 276. The output level of the OR gate 269 is low and that of the inverters 271 high. Therefore, the AND gate 276 transmits the content of the decoder 258a to the OR gate 277. As a result, the computed aperture value is displayed by the LED 260. The content of the Tv register 245, on the other hand, is decoded by the decoder 258b and is impressed on the input terminals of the AND gates 273 and 274. The output level of the inverter 272 is as high as that of the AND gate 270 is low. Then, the content of the decoder 258b is transmitted from the AND gate 274 via the OR gate 281, the AND gate 280 and the OR gate 268 to the liquid crystal 261'. The liquid crystal 261' then displays the set shutter value time. In other words, under the shutter priority photography mode or the manual photography mode, a shutter time setting value is displayed at the external display device 261. A computed aperture value computed and obtained from the object brightness, shutter time, film sensitivity, etc, is displayed by the LED 260, which is included in the view finder display arrangement 218.

When the aperture priority photography mode is selected by means of the safety switch 237a, the photography mode setting switch 237b and the photography mode setting circuit 239 and if the aperture is not stopped down and the eyepiece 215 is left open, the output line Av level alone becomes high among the output lines of the photography mode setting circuit 239. Since the stop-down switch 262 and the switch 263 open, the output level of the OR gate 269 becomes high and that of the AND gate 270 is also high. Then, since the levels of both inputs to the AND gate 265 become high, the AND gate 265 produces a high level output displaying "Av" at the external display arrangement 261. This informs the photographer of the selection of the aperture priority photography mode. Furthermore, the content of the Av register 244 is decoded by the decoder 258a and is impressed on the input terminals of the AND gates 275 and 276. Since the output level of the AND gate 270 is high, the AND gate 275 transmits the content of the decoder 258a to the liquid crystal 261' via the OR gate 281, the AND gate 280 and the OR gate 268. The liquid crystal 261' displays the set aperture value. Furthermore, the content of the Tv register 245 is decoded by the decoder 258b and is impressed on the input terminals of the AND gates 273 and 274. Since the output level of the OR gate 269 is high, the AND gate 273 transmits the content of the decoder 258b via the OR gate 277 to the LED driving circuit 259. Then, since the switch 263 is open, the LED driving circuit 259 operates, causing the LED 260 to display the content of the decoder 258b, which is a computed shutter time value. Under the aperture priority photography mode, therefore, the aperture setting value is displayed at the external display arrangement 261 while the computed shutter time value obtained based on the object brightness, the setting value of aperture and that of film sensitivity are displayed by the LED 260, which is included in the view finder display arrangement 218.

If the lens aperture is stopped down regardless of the set positions of the photography mode setting switch 237b, etc. and the eyepiece 215 is left open, the stop-down switch 262 is closed and the switch 263 opens. Accordingly, the inverter 267 produces a high level output. The OR gate 269 also produces a high level output. Furthermore, the output level of the AND gate 270 is low. Meanwhile, the terminal R output of the LED driving circuit 241 becomes low and operation of the LED driving circuit 241 stops putting out all the LED's 240a–240d. Since the output level of the inverter 267 is high, the electrode level of the display part "SD" of the external display arrangement 261 becomes high, displaying "SD", informing the photographer that the camera is in the stopped down actual aperture priority photography mode. The content of the Av register 244 is decoded by the decoder 258a and is impressed on the input terminals of the AND gates 275 and 276. However, since the output level of the AND gate 270 is low and that of the OR gate 269 high, the output level of the inverter 271 becomes low, making one input level of each of the AND gates 275 and 276 low. Therefore, the AND gates 275 and 276 do not transmit the content of the Av register 244 to the LED 260 and the liquid crystal 261'. As a result, the aperture value is not displayed at all. Furthermore, the content of the Tv register 245 is decoded by the decoder 258b and is impressed on the input terminals of the AND gates 273 and 274. However, since the output level of the OR gate 269 is high and that of the AND gate 270 is low, the output level of the inverter 272 becomes high, causing the AND gate 273 to transmit the content of the decoder 258b to the LED driving circuit 259 via the OR gate 277. Then, since the switch 263 is open, the LED driving circuit 259 is operative and causes the LED 260 to display the computed shutter time value. Furthermore, the content of the decoder 258b is transmitted by the AND gate 274 via the OR gate 281 and the AND gate 280 to the liquid crystal 261', also displaying the computed shutter time value by the liquid crystal 261' in the same manner as with the LED 260. In other words, under the stopped-down actual aperture priority mode, no preset aperture value is displayed while the shutter time value computed from the object brightness, the setting value of aperture, the film sensitivity, etc. is alone displayed at both the LED 260 and the external display arrangement 261. Then, when the eyepiece shutter 219 which is shown in FIG. 15 is closed, the switch 263 closes. This lowers the terminal R level of the LED driving circuit 259. The LED driving circuit 259 stops operating. The LED 260 displays nothing. The AND gate 282 output is at a low level and the terminal R level of the LED driving circuit 241 is also low. The dot LED's 240a–240d, thus, also display nothing. Therefore, the light measuring circuit 230 is not affected by any stray light from the dot LED's 240a–240d. With the eyepiece shutter 219 closed in this manner, i.e. when the switch 263 is closed, if the photography mode selected by the photography mode setting switch 237b is the shutter priority photography mode, the level of one input of the AND gate 280 becomes low by closing the switch 263. In that instance, the AND gate 281 produces a low level output regardless of the OR gate 281 output. Meanwhile, since the inverter 278 produces a high level output, the AND gate 279 transmits the output of the OR gate 277 of the OR gate 268. Accordingly, with the eyepiece shutter 219 closed, the information displayed at the LED 260 under various photography modes is displayed at the liquid crystal 261' of the external display arrangement 261. In this case, the output of the decoder 258a, which is obtained by decoding the content of the Av register 244, is transmitted via the AND gate 276 and the OR gate 277 to the AND gate 279. Then, the output is further applied via the OR gate 268 to the liquid crystal 261', displaying the computed aperture value at the liquid crystal 261'.

As described above, when the eyepiece shutter 219 is closed, the display arrangement within the view finder is completely put out and the computed information is alone displayed at the external display arrangement 261 regardless of the photography mode selected.

Figure 22:
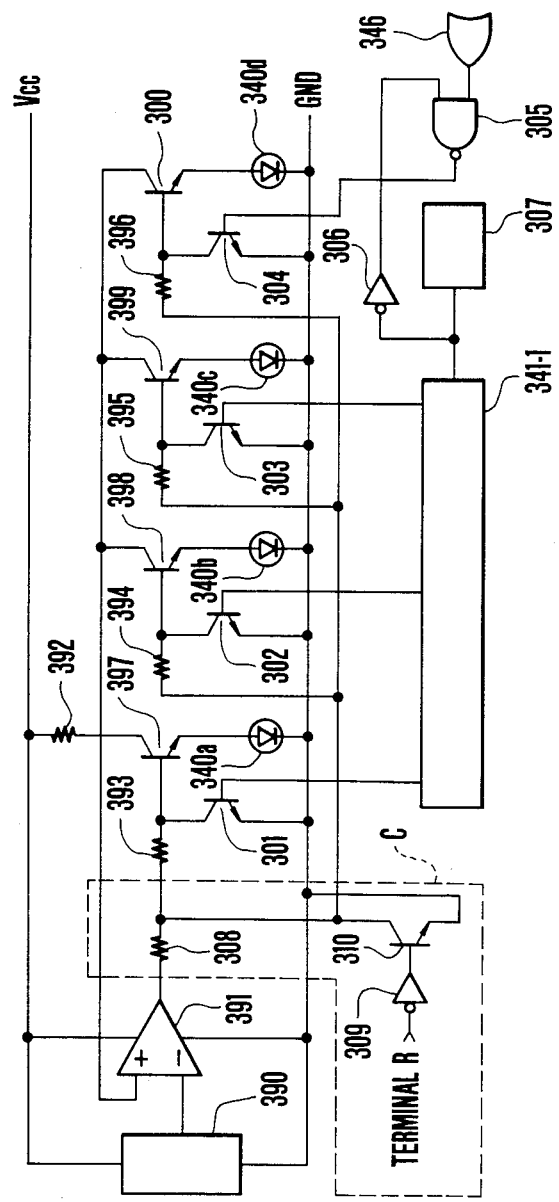

FIG. 22 is a circuit diagram showing, by way of example, the details of the LED driving circuit 241 of FIG. 21. The circuit arrangement of FIG. 22 is the same as that of FIG. 11 with the exception that, in this case, a block C is added to the circuit of FIG. 11. The block C includes a resistor 308 and an inverter 309. The input terminal of the inverter 309 is connected to the terminal R of the LED driving circuit 241 while the output terminal thereof is connected to the base of an NPN transistor 310. The transistor 310 has its emitter connected to the ground GND and its collector to one terminal of each of resistors 393, 394, 395 and 396. With the LED driving circuit arranged in this manner it operates as follows: When a power supply switch (not shown) is pushed, a DC voltage is impressed between the power source Vcc and the ground GND. A constant voltage is produced from a constant voltage circuit 390 and is impressed on the inversion input terminal of an operational amplifier 391. The operational amplifier 391 has negative feedback coinciding the voltage of its non-inversion input terminal with that of the inversion input terminal. Then, the voltage of the terminal of a resistor 392, which is not connected to the power source Vcc, becomes equal to that of the output of the constant voltage circuit 390. In other words, the resistor 392 has a constant voltage, which is the difference between the voltage of the power source Vcc and the output voltage of the constant voltage circuit 390 impressed on the two terminals thereof. As a result, a constant current flows to the resistor 392. Then, assuming that a transistor 301 is non-conductive with its base potential being zero and transistors 302, 303 and 304 are all conductive with their base potentials being high, the base potentials of transistors 398, 399 and 300 are low and they become non-conductive since no base current is supplied to them from the resistors 394, 395 and 396. Thus, no current flows between the collector and emitter of each of the transistors 398, 399 and 300. A transistor 397 alone becomes conductive and the constant current which flows to the resistor 392 flow between the collector and emitter of the transistor 397. Therefore, the constant current also flows to the LED 340a which is connected to the emitter of the transistor 397. The LED 340a lights up. In the same manner, if the base potential of the transistor 302 is alone at a low level while those of the other transistors 301, 303 and 304 are all high, a constant current flows to the LED 340b lightening it up. It is thus possible to have a constant current flow to only one of the plurality of LED's by means of a single operational amplifier.

The LED lighting operation of the circuit is as follows: Among the outputs of a LED driving circuit 341-1, only one of them becomes a low level based on the photography mode selected. However, the time at which the output level becomes low is only when the output level of a pulse oscillator 307 is high. In other words, one of the LED's 340a, 340b, 340c and 340d intermittently lights up at time intervals at which the output level of the pulse oscillator 307 becomes high. Furthermore, as mentioned in the description of the operation of the electric circuit of FIG. 21, in the event of a warning with the shutter time value or aperture value outside a control range, the output level of the OR gate 346 becomes high. However, the output level of the NAND gate 305 becomes low and a constant current flows to the LED 340d only when the output level of the pulse oscillator 307 is low. When any one of the LED's 340a, 340b and 340c is lit, the LED 340d does not light up, even under a warning condition. The LED 340d lights up at the warning time only when none of the other LED's 340a, 340b and 340c are lit. If the cycle of the pulse oscillator 307 is short, however, the LED 340d appears to light concurrently with one of the LED's 340a, 340b and 340c due to the after image effect of the eye.

When the terminal R level becomes low, the inverter 309 produces a high level output, rendering the transistor 310 conductive. The collector level of the transistor 310 becomes low. Therefore, the connection point levels between the resistor 308 and the resistors 393, 394, 395 and 396 become low. The base levels of all the transistors 397, 398, 399 and 300 become low and no emitter current flows for these transistors 397, 398, 399 and 300. As a result, the LED's 340a, 340b, 340c and 304d become extinct.

Figure 23:
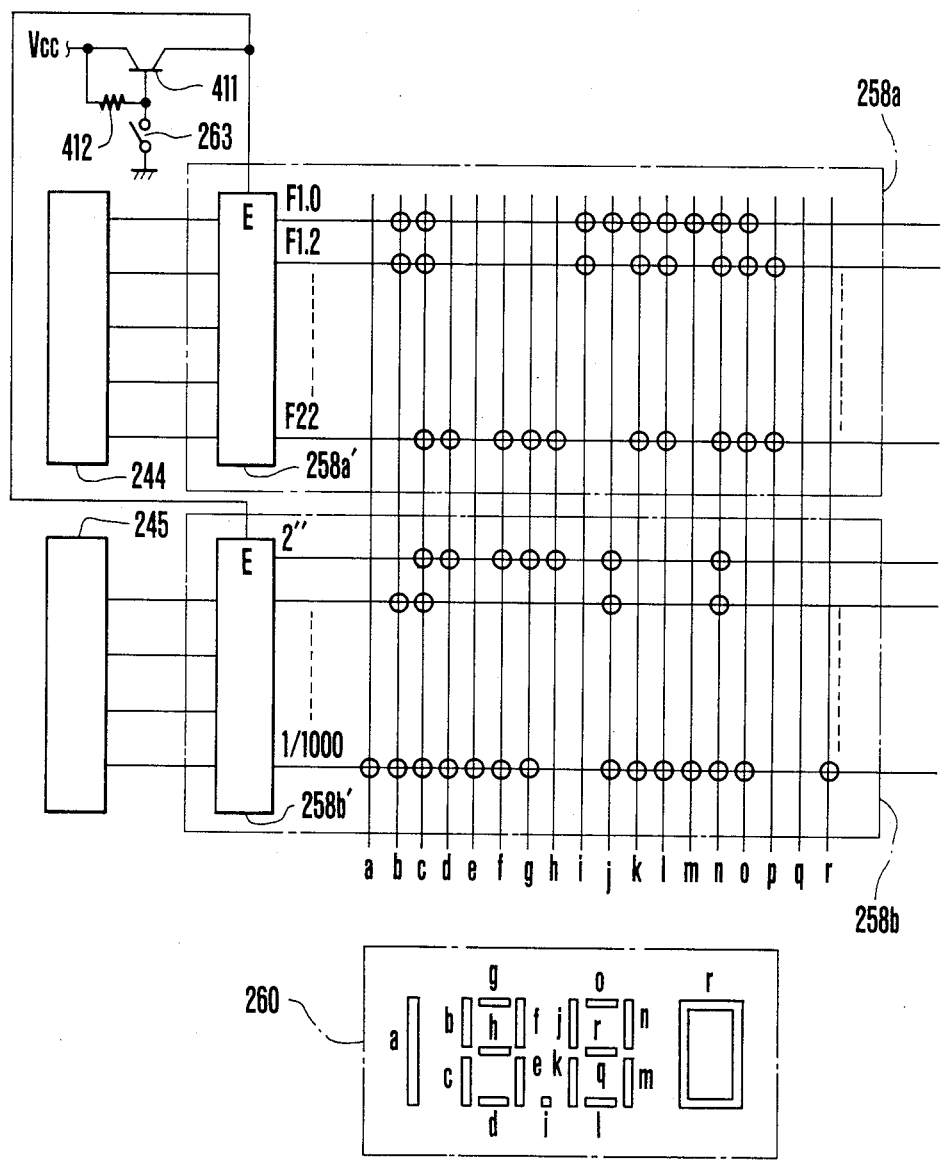

FIG. 23 shows the essential parts of the circuit arrangement required for the display operation of the LED 260. In this drawing, the parts in FIGS. 21 and 22 are identified by the same reference numerals. The circuit arrangement includes a transistor 411. The base of the transistor 411 is connected to the switch 263 and also to the collector thereof via a resistor 412. The collector is connected to the power source Vcc. The emitter of the transistor 411 is connected to the decoders 258a and 258b. The decoder 258a is composed of a five-bit decoder 258a' (having a terminal E as power supply terminal) and a display matrix decoder 258a. The decoder 258a decodes the five-bit information of the Av register 244 and selects an aperture value corresponding to the information. Then the output line level for the selected aperture value becomes high. The display matrix decoder 258a has output lines a, b, c, d, e, f, g, h, i, j, k, l, m, n, o, p, q and r which are respectively connected to the segments of the LED 260 including segments a, b, c, d, e, f, g, h, i, j, k, l, m, n, o, p, q and r through the AND gate 276, the OR gate 277 and the LED driving circuit 259 shown in FIG. 21. The display matrix decoder 258a also includes parts ○ which are conductive parts between aperture values and the segments a–r. The other decoder 258b is also composed of a decoder 258b' having a terminal E as the power supply terminal and a display matrix decoder. The decoder 258b decodes the four-bit information of the Tv register 245. Then, a shutter time value corresponding to the information is selected and the output line level for this value becomes high. The output lines a–r of the display matrix decoder are connected respectively to the segments a–r of the LED 260 through the AND gate 273, the OR gate 277 and the LED driving circuit 259 of FIG. 21. With the circuit arranged in this manner, it operates as described below:

In the shutter priority or manual photography mode with the eyepiece shutter 219 left open, i.e. with the switch 263 open, the base of the transistor 411 is biased through the resistor 412. Power is supplied from the emitter of the transistor 411 to the terminal E of the decoder 258a' to render the decoder 258a' operative. The content of the Av register 244 is decoded by the decoder 258a'. The level of one aperture value output line corresponding to the information of the Av register 244 becomes high. When the computed aperture value is F 1.2, for example, the Av register 244 information makes the output line level for F 1.2 high at the decoder 258a'. Then, the levels of the output lines b, c, i, k, l, n, o and p, which have marks ○ on the output line of F 1.2, become high, lighting up the segments b, c, i, k, l, n, o and p of the LED 260 making a display "1.2" and showing that the computed aperture value is F 1.2.

When using the aperture priority photography mode with the eyepiece shutter 219 open, power is supplied from the power source to the terminal E of the decoder 258b' to render the decoder 258b' operative. The content of the Tv register 245 is decoded by the decoder 258b'. The level of one of the output lines of the decoder 258b' which corresponds to the information or content of the Tv register 245, becomes high. If the computed shutter time is 1 sec in this case, for example, the information of the Tv register 245 makes the output line level for the shutter time value "1" high at the decoder 258b'. Then, the levels of the display matrix decoder output lines b, c, j and n, which have marks ○ on the line for "1", become high. As a result, the segments b, c, j and n of the LED 260 light up, displaying "1", showing that the computed shutter time in this case is 1 second. For shutter time values other than 1 sec, the display matrix decoder of the decoder 258b is capable of displaying shutter time values ranging from 1/1000 to 2 sec in the same manner as described in the foregoing with reference to FIG. 19.

Furthermore, in situations where the eyepiece shutter 219 is closed, i.e. the switch 263 is closed, the base of the transistor 411 is grounded regardless of the photography mode. In that event, therefore, the emitter of the transistor 411 produces no voltage. The levels of all the output lines a–r of the display matrix decoder become low and the LED 260 does not light up.

The liquid crystal 261' of the external display arrangement 261 has the same segment arrangement as that of the LED 260. Accordingly, the liquid crystal 261' performs a display operation in the same manner as the LED 260.

What we claim:

1. A display device for a camera, comprising:
   an external display arrangement for displaying an exposure information setting value;
   a view finder display arrangement for displaying a computed exposure value;
   an eyepiece shutter for closing a view finder;
   photographic information computing means;
   first driving means for displaying a signal produced from said photographing information computing means by means of said view finder display arrangement;
   stopping means for stopping the operation of said view finder display arrangement in response to the operation of said eyepiece shutter; and
   second driving means for displaying the signal of said photographic information computing means at said external display arrangement in response to the operation of said stopping means.

2. A display device for a camera according to claim 1, further comprising:
   photographing mode display means for displaying a selected photographing mode;
   switch means arranged to operate in response to an aperture stopping down operation;
   stopping means for stopping the display operation of said photographing mode display means in response to the operation of said switch means; and
   means for displaying an aperture stopping-down operation in response to said switch means.

3. A display device for a camera according to claim 2, further comprising:
   third driving means for displaying computed information of said photographic information computing means at said view finder display arrangement on the basis of signals from said switch means and stopping means.

4. A display device for a camera, comprising:
   (a) a circuit substrate with a plurality of illuminating light emitting elements and a 7-segment light emitting element having at least two figures mounted on the same surface;
   (b) a light shield plate which is positioned superposedly over said circuit substrate and has light passing holes formed at positions of said substrate to correspond to said illuminating light emitting elements and said 7-segment light emitting element;
   (c) a display plate which is positioned superposedly over said light shield plate and has photographing mode marks placed at positions of said substrate to correspond to said illuminating light emitting elements;
   (d) photographing mode selecting means;
   (e) photographing information computing means;
   (f) a first display circuit which causes said illuminating light emitting elements to emit light according to a selection mode by said photographing mode selecting means; and
   (g) a second display circuit which displays the photographing information in the form of numerals with said 7-segment light emitting element by an output of said photographing information computing means.

5. A display device for a camera a single segment construction for forming the lowest figure as "0" only, the highest figure as "1" only, a mid point as a dot only and 7-segment construction for forming other figures.

6. A display device for a camera, comprising:
   (a) display means having four figures for display, said display means including:
      (1) the lowest figure arranged to display "0" only;
      (2) the second from the lowest figure having a first variable numeral display segment construction;
      (3) the third from the lowest figure having a second numeral variable display segment construction; and
      (4) the highest figure arranged to display "1" only;
   (b) photographing information computing means for computing a shutter time; and
   (c) a display circuit for causing said display means to make a display of a shutter time computed by said computing means, said display circuit displaying at the time when said computed shutter time is as long a time as one second or longer, numeral information indicating a shutter time by said second variable numeral segment construction at the third figure from the lowest or by said "1" only segment construction at the highest figure, while displaying a long shutter time information by said first variable numeral segment construction at the second figure from the lowest.

7. A display device for a camera, comprising:
   (a) photographing mode selecting means;
   (b) photographing information computing means for computing photographing information at a photographing mode selected by said photographing mode selecting means;
   (c) first display means having a photographing mode display construction and a segment construction which can display numerals and being positioned within a view finder;
   (d) second display means having a photographing mode display construction and a segment construction which can display numerals and being positioned at the outside of a camera body;
   (e) first display control means for making a mode display control of said photographing mode display construction by said first display means based on an output from said photographing mode selecting means, and at the same time making a computed value display control of said segment construction by said first display means based on an output of said photographing information computing means; and
   (f) second display control means for making a mode display control of said photographing mode display construction by said second display means based on an output from said photographing mode selecting means, and at the same time making a computed value display control of the segment construction by said second display means.

8. A display device according to claim 7, wherein said photographing mode display construction at said first and second display means is arranged to display a photographing mode by codes, and said codes are arranged so that a number of numerals in the second display means is larger than that in the first display means.

9. A display device according to claim 7, wherein said photographing mode display construction at said first display means is arranged so as to be able to display a portion of a plurality of photographing modes which can be selected, and said photographing mode display construction at said second display means is arranged so as to be able to display all of the plurality of modes which can be selected.

10. A display device for a camera, comprising:
    (a) an external display arrangement for displaying an exposure information setting value;
    (b) a view finder display arrangement for displaying a computed exposure value;
    (c) photographic information computing means;
    (d) first driving means for displaying a signal produced from said photographing information computing means by said means of said view finder display arrangement;
    (e) an exposure information setting means;
    (f) second driving means for displaying a signal produced from said exposure information setting means by means of said external display arrangement;
    (g) photographing mode selecting means being able to select a plurality of photographing modes including an actual aperture preference mode; and
    (h) third driving means for forcibly supplying a display signal formed at said photographic information computing means at said external display arrangement when said actual aperture preference mode is selected by said photographing mode selecting means.

11. A display device for a camera, comprising:
    (a) a circuit substrate having a plurality of illuminating light emitting elements and a segment light emitting element construction which can display numerals mounted on the same surface thereof;

(b) a light shield plate which is positioned superposedly over said circuit substrate and has light passing holes formed at positions of said substrate to correspond to said illuminating light emitting elements and said segment light emitting element constructions;; and (c) display means having photographing information marks provided at positions corresponding to said illuminating light emitting elements.

12. A display device for a camera, comprising:

(a) display means having a plurality of figures for display, said display means including:
   (1) the lowest figure being arranged to display "0" only;
   (2) the highest figure being arranged to dispaly "1" only; and
   (3) the other figures having a variable numeral segment construction; and
(b) mark constructions for displaying decimal points being positioned between said figures.

* * * * *